United States Patent
Chang et al.

(10) Patent No.: US 11,474,640 B2
(45) Date of Patent: Oct. 18, 2022

(54) TOUCH SENSITIVE PROCESSING APPARATUS AND ELECTRONIC SYSTEM AND METHOD THEREOF FOR REDUCING INTERFERENCE FROM PIXEL REFRESHING

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 17/335,554

(22) Filed: Jun. 1, 2021

(65) Prior Publication Data

US 2021/0286463 A1    Sep. 16, 2021

Related U.S. Application Data

(63) Continuation-in-part of application No. 15/437,640, filed on Feb. 21, 2017, now Pat. No. 11,029,786.
(Continued)

(30) Foreign Application Priority Data

Dec. 30, 2016  (TW) ................................. 105144054
Mar. 18, 2021  (TW) ................................. 110110127

(51) Int. Cl.
   *G06F 3/041*    (2006.01)
   *G06F 3/044*    (2006.01)

(52) U.S. Cl.
   CPC .......... *G06F 3/0418* (2013.01); *G06F 3/0446* (2019.05)

(58) Field of Classification Search
   CPC ... G06F 3/0418; G06F 3/0446; G06F 3/04184
   See application file for complete search history.

(56) References Cited

U.S. PATENT DOCUMENTS 5,606,346 A * 2/1997 Kai ......................... G06F 3/044
                                                         345/173
11,029,786 B2   6/2021 Chang et al.
(Continued)

FOREIGN PATENT DOCUMENTS

CN    103164059 A    6/2013
CN    104699288 B    1/2018
(Continued)

OTHER PUBLICATIONS

Machine Translation of CN 103164059. (Year: 2013).

*Primary Examiner* — Patrick N Edouard
*Assistant Examiner* — Joseph P Fox
(74) *Attorney, Agent, or Firm* — WPAT, PC

(57) ABSTRACT

A touch sensitive processing method for reducing interference from pixel refresh, comprising: sensing horizontal electrodes of a touch screen three times for gathering three sensing values, the sensing steps are separated by a time period; summing the three sensing values as sums; according to the sums, determining an external conductive object is disposed near a N-th horizontal electrode among the horizontal electrode of the touch screen; emitting driving signal from the N-th horizontal electrode and sensing the driving signal via vertical electrodes of the touch screen for gathering an N-th sensing array; and calculating a position of a touch event according to the N-th sensing array and the position of the N-th horizontal electrode.

12 Claims, 14 Drawing Sheets

Related U.S. Application Data

(60) Provisional application No. 62/297,395, filed on Feb. 19, 2016.

(56) References Cited

U.S. PATENT DOCUMENTS

| | | | |
|---|---|---|---|
| 2011/0084926 A1* | 4/2011 | Chang | G01R 27/2605 345/173 |
| 2015/0130750 A1 | 5/2015 | Morrison | |
| 2016/0103521 A1* | 4/2016 | Peng | G06F 3/04166 345/174 |
| 2016/0209963 A1 | 7/2016 | Chang et al. | |

FOREIGN PATENT DOCUMENTS

| | | |
|---|---|---|
| TW | 201743182 | 12/2017 |
| TW | 201828016 | 8/2018 |

\* cited by examiner

TOUCH SENSITIVE PROCESSING APPARATUS AND ELECTRONIC SYSTEM AND METHOD THEREOF FOR REDUCING INTERFERENCE FROM PIXEL REFRESHING

CROSS REFERENCE TO RELATED APPLICATIONS

This application is a continuation-in-part application of U.S. patent application Ser. No. 15/437,640, filed on Feb. 21, 2017, which claims priority under 35 U.S.C. 119 to U.S. provisional patent application, 62/297,395, filed on Feb. 19, 2016, and to Taiwan patent application, 105144054, filed on Dec. 30, 2016. This application also claims benefits of Taiwan patent application, 110110127, filed on Mar. 18, 2021. The disclosures of which are incorporated herein by reference.

BACKGROUND OF THE INVENTION

1. Field of the Invention

The present invention relates to touch screen, and more particularly, to reducing to electromagnetic interference to touch sensitive processing while refreshing pixels.

2. Description of the Prior Art

Touch screens are one of the main input/output devices of modern consumer electronic apparatuses. A typical touch sensitive screen is made in a touch panel whose circuitry is disposed above the screen. There are also touch screens in forms such as in-cell form and on-cell form, both of which are applicable within the scope of the invention of this application. For example, the contents of U.S. patent application Ser. No. 14/081,018, filed on Nov. 15, 2013 by the Applicant, can be an exemplary reference for this application.

Every touch screen possesses display characteristics including refresh rate and display resolution. Refresh rate commonly refers to the frequency of refreshing the screen, and is usually expressed in terms of the unit of frame per second (FPS). Taking the standards for analog televisions by the National Television System Committee (NTSC) for example, a touch sensitive screen has a refresh rate of 59.94 Hz and a resolution of 440×480 (440 by 480). The standard video graphic array (VGA)'s resolutions include 640×480 (640 by 480) and 320×200 (320 by 200) pixels, and their refresh rates include 50, 60, 70 Hz, etc. The common high resolution specification 1080P has a resolution of 1920× 1080 (1920 by 1080), and has refresh rates of 24, 25, 30, 60 Hz, etc.

In general, every pixel of a modern liquid crystal display (LCD) has a corresponding pixel electrode used to twist polarity of liquid crystal, thereby changing transmittance of the liquid crystal of the pixel. Therefore, the amount of light transmission of light-emitting diodes of different colors below the liquid crystal can be controlled, and it is used to further control the color of each pixel. Typically, screen display controller uses square waves to implement PWM (pulse width modulation). PWM could be used to control transparency of liquid crystal of each pixel. As mentioned by U.S. Pat. No. 8,421,828, polarity of liquid crystal layer is related to RMS (root-mean-square) of voltage applying to the liquid crystal layer. During human eye's visual persistent period, signal modulated by PWM could be applied to liquid crystal layer for controlling the polarity of the layer so as to control the transparency of the layer.

A resolution such as 640×480 represents that there are 640 pixels on each horizontal axis and 480 pixels on each vertical axis of the screen. To refresh or update a screen, usually pixels of the uppermost horizontal axis are refreshed first. From the left to the right side, and then from the uppermost to the lowest horizontal axis, until refreshing of all pixels of all the horizontal axes is finished, completing the refreshing of a frame. Under a display characteristic of a refresh rate of 60 Hz, refreshing of 60 frames in the screen must be finished in 1 second. Further, there may be a period during which the screen appears still, before refreshing the first pixel and after refreshing the last pixel of each horizontal axis, which period may be called a horizontal blank. And there may be a period during which the screen appears still when refreshing the screen with the next frame, which period may be called a vertical blank.

For example, the screen specification 1080P60 (with a refresh rate of 60 Hz) has vertical blank appearing every 16.667 ms or 1/60 second, and since there are 1080 horizontal axes, the screen specification has horizontal blank appearing every 15.4 us or 1/(60*1080) second.

As shown in FIG. 1, typical touch sensitive electrodes are usually laid out along horizontal and vertical axes of a touch sensitive screen 110. It may be assumed that a plurality of parallel touch sensitive electrodes stretching along the horizontal axis are referred to as first electrodes 121, and a plurality of parallel touch sensitive electrodes stretching along the vertical axis are referred to as second electrodes 122. These first and second electrodes are usually connected or coupled to a touch sensitive processor 130, which performs touch sensitive detections by mutual-capacitance and/or self-capacitance.

Due to limitations on the design and costs of making of a touch sensitive processor, the number of touch sensitive electrodes that can be connected to the touch sensitive processor is very limited, so the numbers of first electrodes and second electrodes are usually less than respective aspects of the resolution of the screen. Taking a touch sensitive screen size of about 50 inches for example, its horizontal axis length is about 1130 mm and vertical axis length is about 670 mm. If the spacing between two electrodes is set as 8 mm, the screen will contain about 83 first electrodes and 141 second electrodes. In case the specification of the touch sensitive screen is 1080P, horizontal axis length of each pixel is 0.59 mm, and vertical axis length of each pixel is 0.62 mm. In other words, each first electrode covers about 12 pixel horizontal axes.

FIG. 2 shows an enlarged view of a part of a touch screen. As shown in FIG. 2, the upper portion includes a circuit comprising horizontal first electrodes 121 and vertical second electrodes 122 laid out and interconnected in rhombus shape, and the lower portion includes a pixel array comprising individual pixels 210. Since the number of all pixels is very large, not all of the pixels of the pixel array are shown. In refreshing or updating a screen, the refreshing is performed by the unit of a pixel horizontal axis 220. In the embodiment shown in FIG. 2, it can be seen that each first electrode 121 covers 6 pixel horizontal axes 220, wherein pixel horizontal axis 221 is located between two first electrodes, and pixel horizontal axis 222 is covered by a first electrode.

It is common for a touch screen 110, touch sensitive processor 130 and display controller are operating independently. Touch sensitive processor 130 usually has no idea of the display characteristics of the touch screen 110 such as resolution and refresh rate. Moreover, touch sensitive processor 130 also has no information which the pixel horizontal axis of the touch screen 110 is updated by the display controller. Touch sensitive processor 130 may perform mutual capacitive detection by directing one first electrode 121 parallel to pixel horizontal axes to transmit multiple square waves as driving signal and directing all second electrodes 122 to receive sensing signal with regard to the driving signal. If coincidentally a pixel horizontal axis covered by the first electrode 121 is updated concurrently by the display controller, the polarity level of the pixel's liquid crystal would be severely affected since the driving signal is composed by square waves and the pixel update is also controlled by PWM signal such that the user of the touch screen may observe brightness abnormality around the first electrode 121. However, the detection period of the touch sensitive processor and the screen refresh are quite fast. The probability of observing brightness abnormality while mutual capacitive detection is performed is not high.

In performing mutual-capacitive detection, the touch sensitive processor 130 directs touch sensitive driving electrodes in turn to output driving signals and directs touch sensitive sensing electrodes to sense the driving signals. Since the touch sensitive processor's sensing circuits are more expensive than its driving circuits, in the above design the designer may choose the first electrodes whose quantity is less than that of the second electrodes as touch sensitive sensing electrodes, while using the second electrodes as touch sensitive driving electrodes.

When using second electrodes as touch sensitive driving electrodes to perform a full screen mutual-capacitive detection, the touch sensitive processor directs the second electrodes in turn to output alternative current (AC) pulse signal, such as square or rectangular waves or sinusoidal waves. When the frequency of the AC pulse signal is 200 kHz and each pulse lasts 30 periods, then the duration that each of the second electrodes outputs the pulse signal is 0.15 ms or 150 us, which is 30/200,000 seconds. Since there are 141 second electrodes, and switching from one second electrode to the next one to output the AC pulse signal takes some time, performing a full-screen mutual-capacitive detection requires at least about 0.02115 seconds, 21.15 ms, or 21150 us, which is much longer than the refresh time 15.4 us of each pixel horizontal axis. When the frequency of the AC pulse signal is 100 kHz, and each pulse lasts 30 periods, then the duration that each of the second electrodes outputs the pulse signal is 0.33 ms, which is 30/100,000 seconds. Since there are 141 second electrodes, and switching from one second electrode to the next one to output the pulse signal takes some time, performing a full-screen mutual-capacitive detection requires at least about 0.04653 seconds, 46.53 ms, or 46530 us, which is much longer than the refresh time 15.4 us of each pixel horizontal axis.

When using first electrodes and second electrodes to perform self-capacitive detection, the touch sensitive processor directs all first electrodes and all second electrodes respectively to output a driving signal, and to detect or measure the signal. If using the same AC pulse signal with 200 kHz and each pulse lasting 30 periods as the driving signal, the required time for all the first electrodes to output the signal is 0.15 ms, and the required time for all the second electrodes to output the signal is also 0.15 ms, which two periods total 0.3 ms or 300 us, which is much longer than the refresh time 15.4 us of each pixel horizontal axis.

When refreshing a certain pixel horizontal axis, new pixel data will be sent to corresponding pixel electrodes of the pixel horizontal axis. Thus, the liquid crystal display area near the pixel horizontal axis will present larger electromagnetic interference (EMI) than that presented by a liquid crystal display area elsewhere, and the larger electromagnetic interference affects the touch sensitive electrode. In the above example, since each first electrode covers about 12 pixel horizontal axes, most pixel horizontal axes substantially interfere with only a first electrode, such as pixel horizontal axes 222 shown in FIG. 2. And few pixel horizontal axes are located between two first electrodes, such as pixel horizontal axes 221 shown in FIG. 2, substantially interfere with the two first electrodes rather than other farther first electrodes.

Since the touch sensitive processor responsible for touch sensitive detection is not connected to the display controller responsible for displaying, when refreshing a certain pixel horizontal axis, the touch sensitive processor cannot avoid performing touch sensitive detection on the first electrode covering the pixel horizontal axis to avoid receiving the EMI when refreshing the pixel horizontal axis. Therefore a purpose of the invention of this application is to provide a touch sensitive method of a touch sensitive processor, wherein detection is performed on multiple first or horizontal electrodes at appropriate intervals, followed by judging which first electrode's detection result is actually related to touch sensitive, or is actually not related to touch sensitive and therefore should be excluded from touch sensitive calculation, which exclusion can help the touch sensitive calculation avoid or reduce the EMI effects on the touch sensitive calculation.

Hence, the problem that the present application intends to solve is how to distinguish which horizontal electrodes are relevant to touch and to perform further detections on the relevant horizontal electrodes in order to get more precisely touch positions.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

According to an aspect of the present invention, a touch sensitive processing method for reducing interference from pixel refreshing is provided. The touch sensitive processing method comprising: performing a first detection via multiple horizontal electrodes of a touch screen to generate multiple first sensing values; after a time interval, performing a second detection via the multiple horizontal electrodes to generate multiple second sensing values; after the time interval, performing a third detection via the multiple horizontal electrodes to generate multiple third sensing values; adding the first sensing values, the second sensing values and the third sensing values with respect to the multiple horizontal electrodes up as multiple sums of sensing values; determining that an external conductive object is approximating or touching the touch screen nearby a N-th horizontal electrode among the multiple horizontal electrodes according to the multiple sums; emitting driving signals via the N-th horizontal electrode and performing mutual-capacitance detection of the driving signals via multiple vertical electrodes in order to get an N-th array of sensing values; and calculating a position of the external conductive object locates according to the array of sensing values and a position of the N-th horizontal electrode, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

Preferably, in order to calculate a more precisely position of the external conductive object, the touch sensitive processing method further comprises: emitting, respectively, driving signals via a (N−1)-th horizontal electrode and a (N+1)-th horizontal electrode and performing mutual-capacitance detection of the driving signals via the multiple vertical electrodes in order to get an (N−1)-th array of sensing values and an (N+1)-th array of sensing values; and calculating the position of the touch event according to the (N−1)-th, the N-th and the (N+1)-th arrays of sensing values and positions of the (N−1)-th, the N-th and the (N+1)-th horizontal electrodes.

According to an aspect of the present invention, a touch sensitive processing apparatus for reducing interference from pixel refreshing is provided. The touch sensitive processing apparatus comprising: a driving circuit module; a sensing circuit module; and a processor module, connecting to the driving circuit module and the sensing circuit module, configured for executing instructions stored in non-volatile memory to realize following steps: having the sensing circuit module to perform a first detection via multiple horizontal electrodes of a touch screen to generate multiple first sensing values; after a time interval, having the sensing circuit module to perform a second detection via the multiple horizontal electrodes to generate multiple second sensing values; after the time interval, having the sensing circuit module to perform a third detection via the multiple horizontal electrodes to generate multiple third sensing values; adding the first sensing values, the second sensing values and the third sensing values with respect to the multiple sensing electrodes up as multiple sums of sensing values; determining that an external conductive object is approximating or touching the touch screen nearby a N-th horizontal electrode among the multiple horizontal electrodes according to the multiple sums; having the driving circuit module to emit driving signals via the N-th horizontal electrode and performing mutual-capacitance detection of the driving signals via multiple vertical electrodes in order to get an N-th array of sensing values; and calculating a position of the external conductive object locates according to the array of sensing values and a position of the N-th horizontal electrode, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

Preferably, in order to calculate a more precisely position of the external conductive object, the processor module is further configured for: having the driving circuit module to emit, respectively, driving signals via a (N−1)-th horizontal electrode and a (N+1)-th horizontal electrode and having the sensing circuit module to perform mutual-capacitance detection of the driving signals via the multiple vertical electrodes in order to get an (N−1)-th array of sensing values and an (N+1)-th array of sensing values; and calculating the position of the touch event according to the (N−1)-th, the N-th and the (N+1)-th arrays of sensing values and positions of the (N−1)-th, the N-th and the (N+1)-th horizontal electrodes.

According to an aspect of the present invention, a touch sensitive processing method for reducing interference from pixel refreshing is provided. The touch sensitive processing method comprising: performing a first detection via multiple horizontal electrodes of a touch screen to generate multiple first sensing values; after a time interval, performing a second detection via the multiple horizontal electrodes to generate multiple second sensing values; after the time interval, performing a third detection via the multiple horizontal electrodes to generate multiple third sensing values; adding the first sensing values, the second sensing values and the third sensing values with respect to the multiple horizontal electrodes up as multiple sums of sensing values; determining that an external conductive object is approximating or touching the touch screen nearby a N-th horizontal electrode and an (N+1)-th horizontal electrode among the multiple horizontal electrodes according to the multiple sums; emitting, respectively, driving signals via the N-th and the (N+1)-th horizontal electrodes and performing mutual-capacitance detection of the driving signals via multiple vertical electrodes in order to get an N-th array of sensing values and an (N+1)-th array of sensing values; and calculating a position of the external conductive object locates according to the N-th and the (N+1)-th arrays of sensing values and positions of the N-th and the (N+1)-th horizontal electrodes, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

Preferably, in order to calculate a more precisely position of the external conductive object, the touch sensitive processing method further comprises: emitting, respectively driving signals via a (N−1)-th horizontal electrode and a (N+2)-th horizontal electrode and performing mutual-capacitance detection of the driving signals via the multiple vertical electrodes, in order to get an (N−1)-th array of sensing values and an (N+2)-th array of sensing values; and calculating the position of the touch event according to the (N−1)-th, the N-th. the (N+1)-th and the (N+2)-th arrays of sensing values and positions of the (N−1)-th, the N-th, the (N+1)-th and the (N+2)-th horizontal electrodes.

According to an aspect of the present invention, a touch sensitive processing apparatus for reducing interference from pixel refreshing is provided. The touch sensitive processing apparatus comprising: a driving circuit module; a sensing circuit module; and a processor module, connecting to the driving circuit module and the sensing circuit module, configured for executing instructions stored in non-volatile memory to realize following steps: having the sensing circuit module to perform a first detection via multiple horizontal electrodes of a touch screen to generate multiple first sensing values; after a time interval, having the sensing module to perform a second detection via the multiple horizontal electrodes to generate multiple second sensing values; after the time interval, having the sensing module to perform a third detection via the multiple horizontal electrodes to generate multiple third sensing values; adding the first sensing values, the second sensing values and the third sensing values with respect to the multiple horizontal electrodes up as multiple sums of sensing values; determining that an external conductive object is approximating or touching the touch screen nearby a N-th horizontal electrode and an (N+1)-th horizontal electrode among the multiple horizontal electrodes according to the multiple sums; having the driving circuit module to emit, respectively, driving signals via the N-th and the (N+1)-th horizontal electrodes and having the sensing module to perform mutual-capacitance detection of the driving signals via multiple vertical electrodes in order to get an N-th array of sensing values and an (N+1)-th array of sensing values; and calculating a position of the external conductive object locates according to the N-th and the (N+1)-th arrays of sensing values and positions of the N-th and the (N+1)-th horizontal electrodes, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

Preferably, in order to calculate a more precisely position of the external conductive object, the processor module is further configured for: having the driving circuit module to emit, respectively driving signals via a (N−1)-th horizontal electrode and a (N+2)-th horizontal electrode and having the sensing circuit module to perform mutual-capacitance detection of the driving signals via the multiple vertical electrodes in order to get an (N−1)-th array of sensing values and an (N+2)-th array of sensing values; and calculating the position of the touch event according to the (N−1)-th, the N-th. the (N+1)-th and the (N+2)-th arrays of sensing values and positions of the (N−1)-th, the N-th, the (N+1)-th and the (N+2)-th horizontal electrodes.

According to an aspect of the present invention, an electronic system for reducing interference from pixel refreshing, comprising: a touch screen and the aforementioned touch sensitive processing apparatus.

The present invention provides touch sensitive processing apparatus and electronic system and processing method thereof for reducing interference from pixel refreshing. According to multiple sensing results with respect to multiple horizontal electrodes separated in well-arranged time intervals, it distinguishes that which one of the horizontal electrodes is relevant to a touch event or which horizontal electrodes are irrelevant to the touch event. Thus it excludes the sensing results corresponding to the horizontal electrodes which are irrelevant to the touch event or performs one or more additional sensing with respect to the relevant horizontal electrode so as that the calculation of a position of the touch event can avoid or at least reduce the electromagnetic interference from pixel refreshing.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
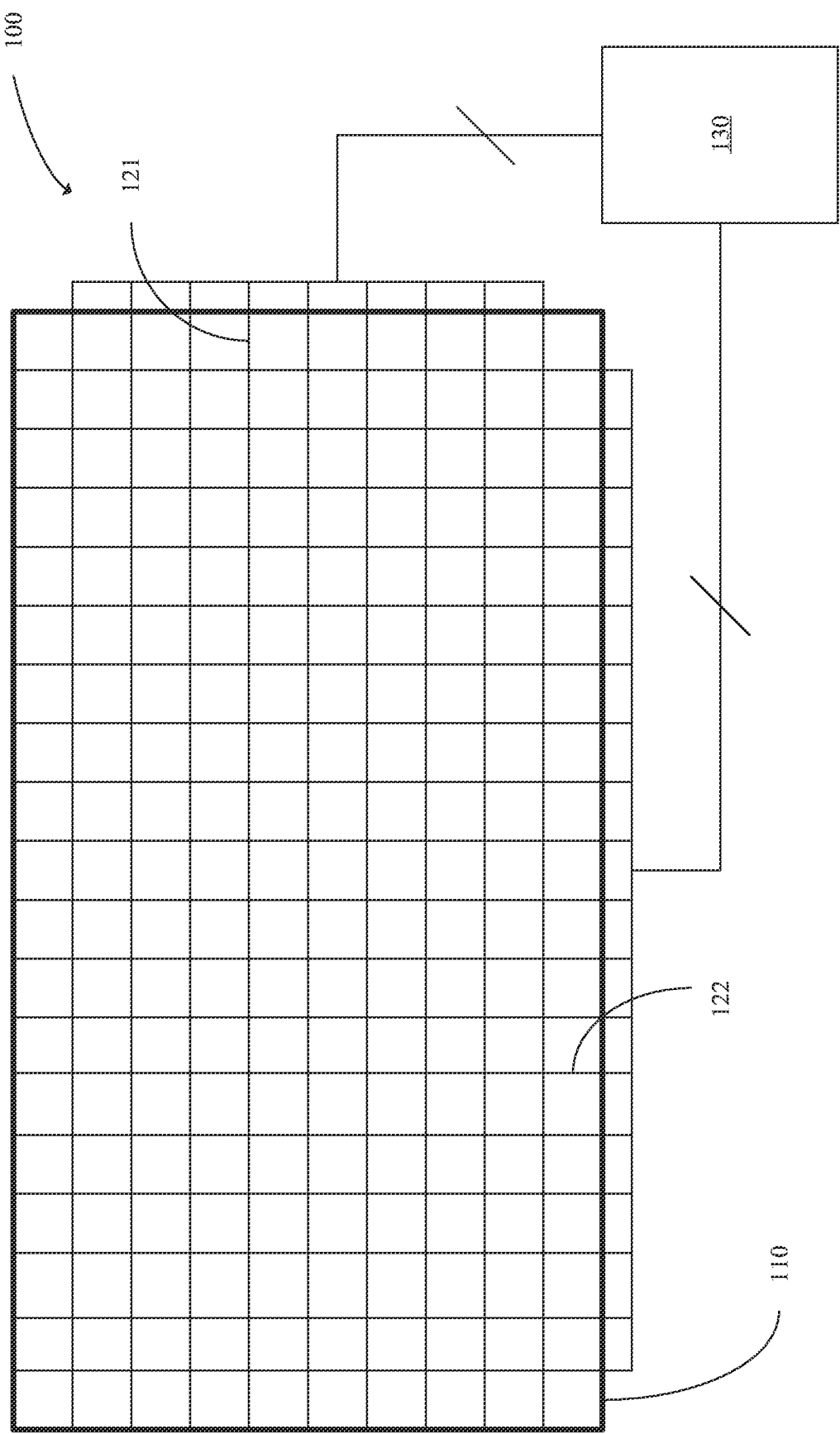
FIG. 1 is a diagram of a traditional touch sensitive electronic system.
Figure 2:
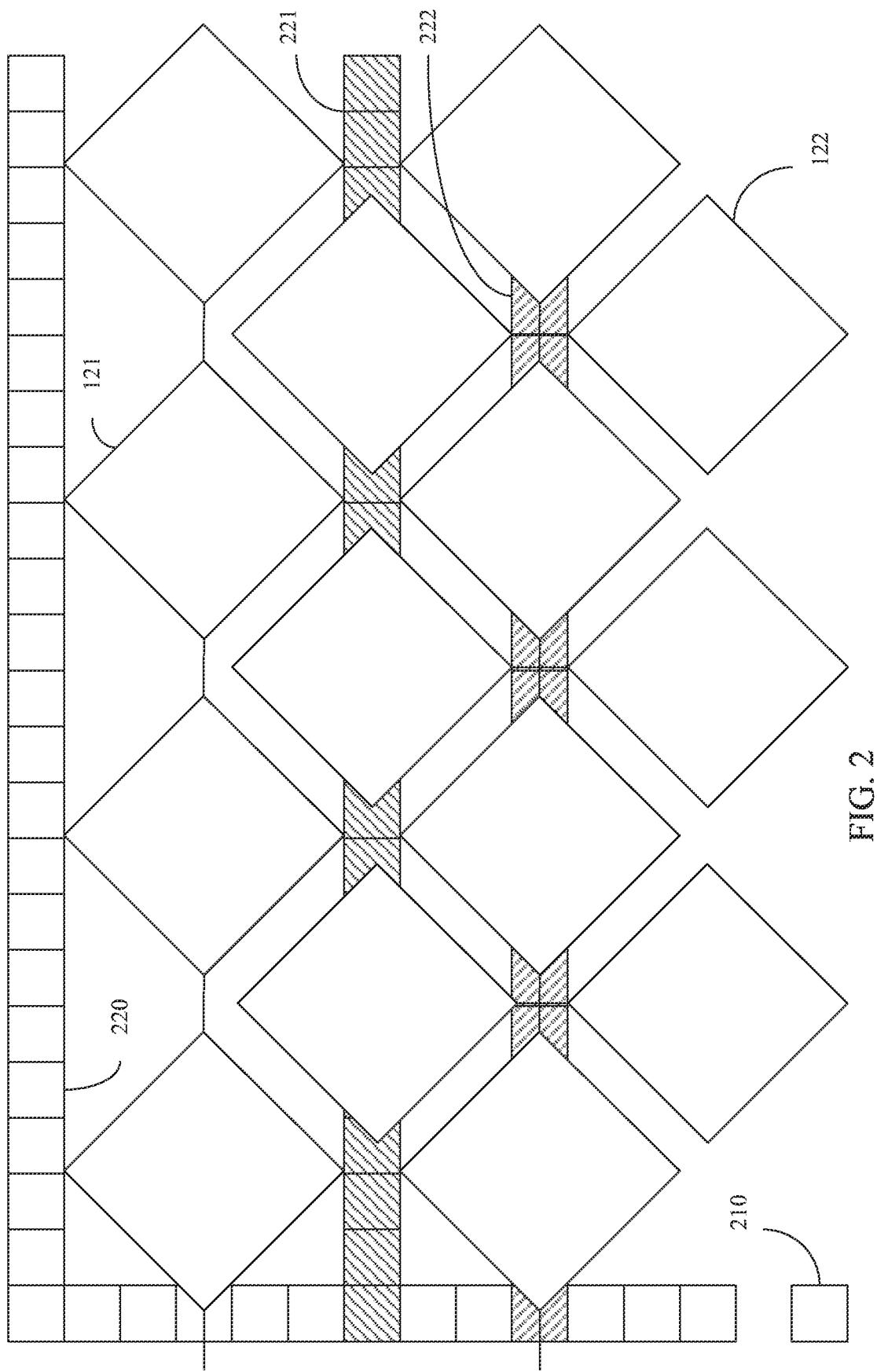
FIG. 2 depicts an enlarged view of a touch screen shown in the FIG. 1.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 3:
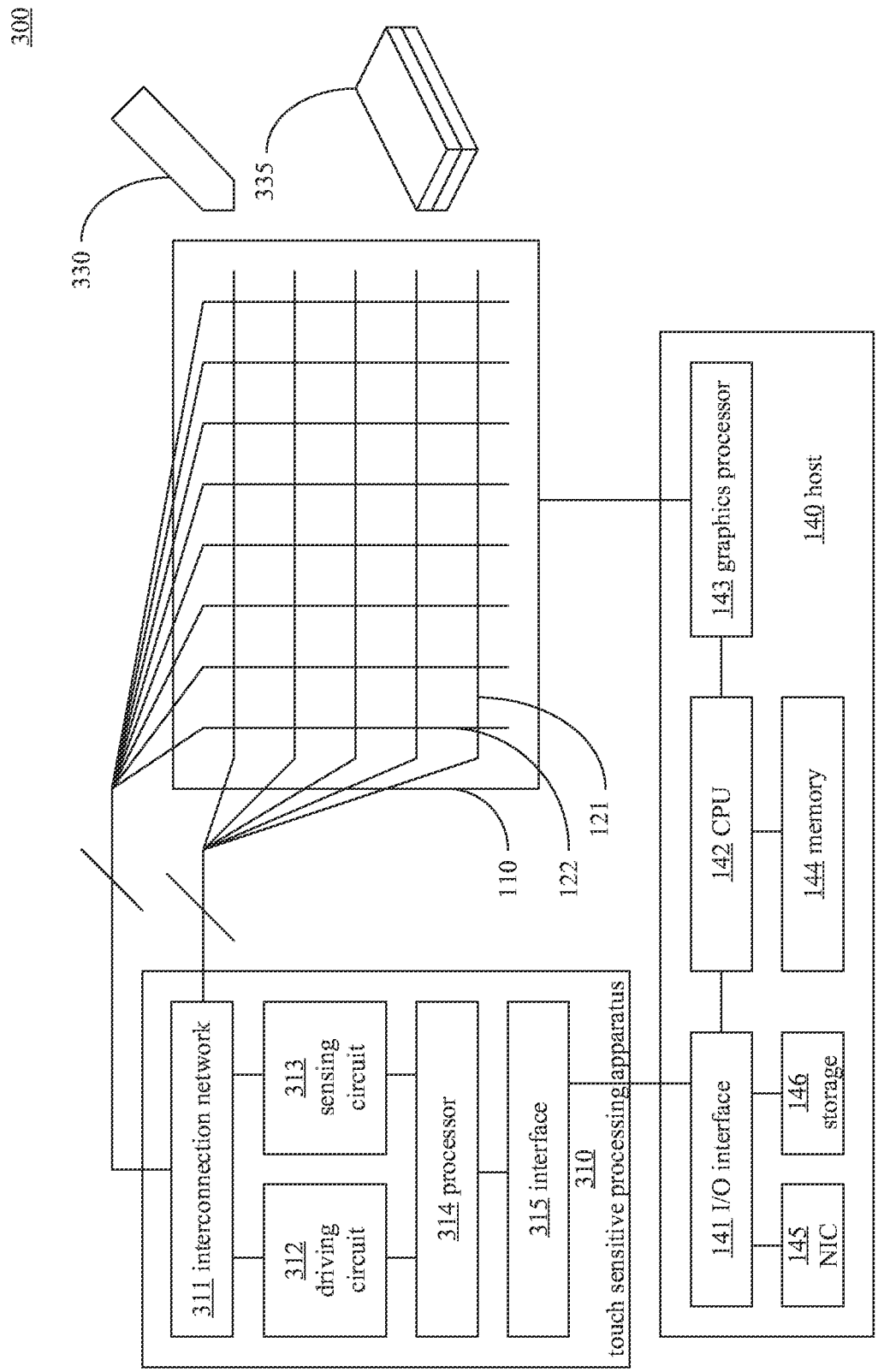
FIG. 3 illustrates a block diagram of a touch sensitive system 300 in accordance with an embodiment of the present invention.

Please refer to FIG. 3, which shows a block diagram of a touch sensitive system 300 in accordance with an embodiment of the present invention. The touch sensitive system 300 may be normal desktop, laptop, tablet personal computer, industrial control computer, smart phone or any other computer system with touch sensitive function.

The touch sensitive system 300 may comprise a touch sensitive processing apparatus 310, a touch panel or touch screen 110 coupled to the touch sensitive processing apparatus 310 and a host 140 coupled to the touch sensitive processing apparatus 310. The touch sensitive system 300 may further comprises one or more styli 330 and/or touch board erasers 335. Hereinafter, the touch panel or screen 120 may be collectively referred as touch screen 120. However, in embodiments which are lack of display function, person has ordinary skill in the art can understand that the touch screen denoted in the present application is actually a touch panel.

The touch screen 120 comprises first electrodes 121 in parallel to a first axis and second electrodes 122 in parallel to a second axis. The first electrode 121 intersects with multiple of the second electrodes 122 in order to form multiple sensing points or areas. Similarly, the second electrode 122 intersects with multiple of the first electrodes 121 in order to form multiple sensing points or areas. In some embodiment, the present application uses first touch electrodes 121 to refer to the first electrodes 121 and uses second touch electrodes to refer to the second electrodes 122. The present application also calls touch electrodes to refer to the first electrodes 121 and the second electrodes 122 collectively. In some embodiments, the first electrodes 121 and the second electrodes 122 may be made by transparent materials. The first electrodes 121 and the second electrodes 122 may be placed in one electrode layer. Multiple conductive plates of each of the first electrodes 121 or the second electrodes 122 may be connected by bridging. Alternatively, the first electrodes 121 and the second electrodes 122 may be placed in two overlaid electrode layers. Unless specified particularly, the present application usually is applicable to single-layer or multiple-layer embodiments. The first axis is usually perpendicular to the second axis. However, the present application does not limit that the first axis has to be perpendicular to the second axis. In one embodiment, the first axis may be the horizontal axis or a refresh axis of the touch screen 120.

The touch sensitive processing apparatus 310 may comprise following hardware circuit modules: an interconnection network module 311, a driving circuit module 312, a sensing circuit module 313, a processor module 314, and an interface module 315. The touch sensitive processing apparatus 310 may be implemented inside a single integrated circuit which may include one or more chips. It may use multiple integrated circuits and an interconnected circuit board carried the multiple integrated circuits to realize the touch sensitive processing apparatus 310. The touch sensitive processing apparatus 310 and the host 140 may be implemented in the same integrated circuits, or in the same chip. In other words, the present application does not limit how to implement the touch sensitive processing apparatus 310.

The interconnection network module 311 is configured to connect each of the multiple first electrodes and/or the multiple second electrodes of the touch screen 120. The interconnection network module 311 may accept control command of the processor module 314 for connecting the driving circuit module 312 and any one or more touch electrodes and for connecting the sensing circuit 313 and any one or more touch electrodes. The interconnection network module 311 may include a combination of one or more MUX to realize the aforementioned functions.

The driving circuit module 312 may comprise clock generator, frequency divider, frequency multiplier, phase lock loop, power amplifier, DC-DC voltage converter, regulator and/or filter, which is configured to provide driving signal to any one or more touch electrodes via the interconnection network module 311 according to control commands of the processor module 314. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 312 may include one or more channel. Each channel may be connected to any one or more touch electrodes via the interconnection network module 311.

The sensing circuit module 313 may comprise clock generator, frequency divider, frequency multiplier, phase lock loop, power amplifier, DC-DC voltage converter, regulator and/or filter, which is configured to sense on any one or more touch electrodes via the interconnection network module 311 according to control commands of the processor module 314. When the touch signal is transmitted from one of the touch electrodes, another touch electrode may induce the touch signal. And the sensing circuit module 130 may demodulate the induced touch signal by the another touch electrode in accordance with the modulation method performed on the driving signal by the driving circuit module 312 in order to restore the messages carried by the driving signal. The sensing circuit module 313 may include one or more channels. Each channel may be connected to any one or more touch electrodes via the interconnection network module 311. In the same time, each channel may simultaneously perform sensing and demodulation.

In one embodiment, the driving circuit module 312 and the sensing circuit module 313 may include analog front-end (AFE) circuits. In another embodiment, in additional to the AFE circuits, the driving circuit module 312 and the sensing circuit module 313 may include digital back-end (DBE) circuits. If the driving circuit module 312 and the sensing circuit module 313 include only the AFE circuits, the DBE circuits may be implemented in the processor module 314.

The processor module 314 may include a digital signal processor for connecting the AFE circuits or the DBE circuits of the driving circuit module 312 and the sensing circuit module 313, respectively. The processor module 314 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 311, the driving circuit module 312, the sensing circuit module 313 and the interface module 315 of the touch sensitive processing apparatus 310. For examples, the processor module 114 may comprises processors widely adopted in the industry such as 8051 series, Intel i960 series, ARM Cortex-M series and etc. The present application does not limit types and numbers of processors included in the processor module 314.

The instructions and data may be used to implement each of steps mentioned in the present application and flows and methods constructed by the steps. Some instructions may be executed independently inside the processor module 314, for examples, arithmetic and log operation instructions. Other instructions may be used to control other modules of the touch sensitive processing apparatus 310. These instructions may include input/output interfaces of the processor module 314 to control other modules. Other modules may provide information via the input/output interface of the processor module 314 to the OS and/or application programs executed by the processor module 314. Persons having ordinary skill in the art should have common knowledge of computer organization and architecture which enabling them to understand that the flows and methods provided by the present application can be realized by the modules and the instructions.

The interface module 315 may include kinds of serial or parallel bus, such as universal serial bus (USB), I$^2$C, peripheral component interconnect (PCI), PCI-Express, IEEE 1394 and other industrial standard input/output interface. The touch sensitive processing apparatus 310 connects to the host 140 via the interface module 315.

The touch system 300 may comprise one or more styli 330 and/or touch erasers 335. The stylus 330 and touch eraser 335 may be transmitters which emit electrical signals. The transmitters may include active transmitter which actively emits electrical signals or passive transmitter which emits electrical signals in response to outside electrical signals. The stylus 330 and touch eraser 335 may comprise one or more electrodes which is configured to receive electrical signals from the touch screen synchronously or asynchronously, or to transmit electrical signals to the touch screen synchronously or asynchronously. The electrical signals may be modulated according to one or more of the aforementioned modulation methods.

The stylus 330 or touch eraser 335 may be conductor which is configured to transmit driving signals or to be grounded via user's hand or body. The stylus 330 or touch eraser 335 may be wired or wirelessly connected to an I/O interface module 141 of the host 140 or any other underlying modules of the I/O interface module 141.

The touch sensitive processing apparatus 310 may detect one or more external conductive objects such as fingers, palms or passive styli 330 or touch erasers 335 or styli 330 or touch erasers 335 emitting electrical signals via the touch screen 120. The touch sensitive processing apparatus 310 may utilize mutual-capacitance or self-capacitance principles to detect external conductive objects. The styli 330 or touch erasers 335 and touch sensitive processing apparatus 310 may use the aforementioned modulation and demodulation methods to transmit message via the electrical signals. The touch sensitive processing apparatus 310 may detect one or more positions where the stylus 330 or touch erasers 335 touches or approximates the touch screen 120, status or sensors (pressure sensor or button) onboard the stylus 330 or touch eraser 335, orientation angle or inclination angle of the stylus 330 or touch erasers 335 with respect to the touch screen 120 and etc. according to the electrical signals.

The host 140 is a main apparatus for controlling the touch system 100. It may comprises an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and one storage module 146. The CPU module 142 may comprises one or more processor or processor cores. Common processors may include Intel, AMD, VIA's x86 and x64 instruction set architecture (ISA) processors, Apple, Qualcomm, Mediatek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the touch system 100.

The optional graphics processor module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware modules. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Table 1 shows the detection results of a touch sensitive method according to an embodiment of the present invention. The touch sensitive method may be implemented by the touch sensitive processing apparatus 310 as shown in FIG. 3. The touch sensitive method may be implemented as instructions stored in non-volatile memory module for execution by the processor module 314. Referring to Table 1, (three) horizontal electrodes or first electrodes 121 adjacent to each other detect for three times at appropriate intervals between the three detections. The detections of the first electrodes may refer to mutual-capacitive detection, self-capacitive detection, first mutual-capacitive detection followed by self-capacitive detection, or a detection of an active stylus, respectively mentioned above. The invention is not limited to embodiments using a particular type of detection, and is applicable when detection of touch sensitive electrodes is parallel to refreshing of pixel horizontal axes.

TABLE 1

| | First detection | Second detection | Third detection | Result of judging |
|---|---|---|---|---|
| (N − 1)-th horizontal electrode | EM Interfered by refreshing pixel horizontal axis | | | |
| N-th horizontal electrode | Touch sensitive signal | EM Interfered by refreshing pixel horizontal axis + Touch sensitive signal | Touch sensitive signal | Touch sensitive signal actually received |
| (N + 1)-th horizontal electrode | | | EM Interfered by refreshing pixel horizontal axis | |

In Table 1, when performing the first detection, it's the (N−1)-th horizontal electrode that is EM interfered caused by refreshing pixel horizontal axis, so the (N−1)-th first electrode produces the detection value, which may exceeds a certain threshold value. In addition, the N-th horizontal electrode has a touch sensitive signal produced by a real touch. If touch sensitive calculation is performed for only the first detection, the EMI suffered by the (N−1)-th horizontal electrode will be taken into account.

When performing the second detection after an appropriate time interval from the first detection, since refreshing of pixel horizontal axes in the screen has moved down the screen with time, it would be the N-th horizontal electrode that is EM interfered now. At the same time the touch sensitive signal is still detected or sensed by the N-th horizontal electrode, but not detected by both the (N−1)-th horizontal electrode and the (N+1)-th horizontal electrode.

Subsequently when performing the third detection after an interval from the second detection, since refreshing of pixel horizontal axes in the screen has further moved down the screen with time, it would be the (N+1)-th horizontal electrode that is EM interfered now. At the same time the touch sensitive signal is still detected or sensed by the N-th horizontal electrode, so the N-th horizontal electrode and the (N+1)-th horizontal electrode each produces a detection value.

After performing the three detections, the touch sensitive apparatus 310 may discover from the results in Table 1 that the phenomenon of the EMI affects the (N−1)-th horizontal electrode, the N-th horizontal electrode, and the (N+1)-th horizontal electrode respectively with time. However, the N-th horizontal electrode produces a detection value in each of the three detections, so it may be judged that the detection values of the N-th horizontal electrode in the first and third detections are valid and could be used in the touch sensitive calculation.

In another embodiment, the touch sensitive apparatus 310 can add up detection values of the three detections. And since the total detection value of the N-th horizontal electrode is the largest, it may be judged that the detection value of the N-th horizontal electrode is the actual touch sensitive signal.

Since the detection value of the second detection of the N-th horizontal electrode is the largest among its three detection values of the three detections, it may be appropriate to take the first or the third detection results/values into the touch sensitive calculation. Or it may be appropriate to take the smallest detection result/value into the touch sensitive calculation. In the touch sensitive calculation for a horizontal electrode, detection values of adjacent horizontal electrodes may be regarded as interferences and therefore ignored or not taken into account. For example, when taking the first and third detection results/values of the N-th horizontal electrode into the touch sensitive calculation, detection values of the (N−1)-th and (N+1)-th horizontal electrodes may be ignored.

In one embodiment, after being aware that a touch event is happened around the N-th horizontal electrode, driving signals may be emitted via the N-th horizontal electrode and sensing the driving signals by all of vertical electrodes or second electrodes 122 according to mutual capacitance principle in order to gather an array of sensing values. Each element in this array is corresponding to an intersection between the N-th horizontal electrode and one of the vertical electrodes. According to this array and the position of the N-th horizontal electrode, a position of the touch event can be calculated. Since the pixel axes of screen refresh move downward in the moment, the reference interference does not occur around the N-th horizontal electrode. The mutual capacitance sensing results via the vertical electrodes are more accurate than the first detection results or the third detection results with refresh interferences. Moreover, the horizontal interferences from screen refresh are applicable to all of the vertical electrodes or the second electrodes 122. It should be equal in applied to all of the vertical electrodes or the second electrodes 122. Thus, in the calculation of the horizontal position, inequality is not a question.

In an alternative embodiment, after being aware that a touch event is happened around the N-th horizontal electrode, driving signals may be emitted via the (N−1)-th, the N-th and the (N+1)-th horizontal electrodes and sensing the driving signals by all of vertical electrodes or second electrodes 122 according to mutual capacitance principle in a time-sharing manner in order to gather three arrays of sensing values. Based on the three arrays and the positions of the (N−1)-th, the N-th and the (N+1)-th horizontal electrodes, a position of the touch event can be calculated. Since the pixel axes of screen refresh move downward in the moment, the reference interference does not occur around the (N−1)-th through the (N+1)-th horizontal electrodes. The mutual capacitance sensing results via the vertical electrodes are more accurate than the first detection results or the third detection results with refresh interferences.

In the embodiment as shown in Table 1, the time interval between detections may be a numerical value stored in advance. For example, in consumer electronic products, the user typically cannot change or adjust the resolution of a touch sensitive screen, so the touch sensitive apparatus 310 may perform multiple detections at an interval stored in advance.

In other embodiments, the touch sensitive apparatus 310 or its driver program may acquire the resolution, refresh rate, and size of the touch sensitive screen 120 from the operating system of the touch system 300 to calculate the time required for refreshing a pixel horizontal axis. And, according to the number of pixel horizontal axes covered by each first electrode, the time interval may be set as being larger than or equal to the product of the required update time and the number of pixel horizontal axes. That is, the time interval between detections of two first electrodes 121 may be set so as different horizontal electrode in the two detections being mostly interfered by refreshing of pixel horizontal axes. For example, in the above example(s), in case each horizontal electrode or first electrode 121 covers about 12 pixel horizontal axes, and the (refresh) time required to refresh each pixel horizontal axis is 15.4 us, then time interval between detections of two horizontal electrodes may be set as being larger than 184.8 us.

In some embodiments, if the touch sensitive apparatus 310 cannot obtain the resolution, refresh rate, and/or size of the touch sensitive screen 120, it may dynamically adjust the time interval. For example, when the touch sensitive apparatus 310 hasn't detected any touching object, it may adjust the time interval until detection results such as those in Table 2 appear.

TABLE 2

| | First detection | Second detection | Third detection | Result of judging |
|---|---|---|---|---|
| (N − 1)-th horizontal electrode | EM Interfered by refreshing pixel horizontal | | | |

TABLE 2-continued

|  | First detection | Second detection | Third detection | Result of judging |
|---|---|---|---|---|
|  | axis |  |  |  |
| N-th horizontal electrode |  | EM Interfered by refreshing pixel horizontal axis |  |  |
| (N + 1)-th horizontal electrode |  |  | EM Interfered by refreshing pixel horizontal axis |  |

Since the total amount of detection values of the three detections for each of the three horizontal electrodes are roughly the same and all the detection values appear in sequence between the three detections, so the touch sensitive apparatus 310 may understand that the set time interval is appropriate. And afterwards the set time interval may be used as a set detection parameter.

Table 3 shows the detection results according to another embodiment of the present invention. When each horizontal electrode or first electrode 121 covers multiple pixel horizontal axes, detection results would usually be like those as shown in Table 1. However, in fewer instances or cases, when detections of the horizontal electrodes are performed while the refreshing of pixel horizontal axes located between different horizontal electrodes, detection results would appear as shown in Table 3.

TABLE 3

|  | First detection | Second detection | Third detection | Result of judging |
|---|---|---|---|---|
| (N − 1)-th horizontal electrode | some EM Interfered by refreshing pixel horizontal axis |  |  |  |
| N-th horizontal electrode | some EM Interfered by refreshing pixel horizontal axis + Touch sensitive signal | some EM Interfered by refreshing pixel horizontal axis + Touch sensitive signal | Touch sensitive signal | Touch sensitive signal actually received |
| (N + 1)-th horizontal electrode |  | some EM Interfered by refreshing pixel horizontal axis | some EM Interfered by refreshing pixel horizontal axis |  |
| (N + 2)-th horizontal electrode |  |  | some EM Interfered by refreshing pixel horizontal axis |  |

Referring to Table 3, when performing the first detection, it happens that pixel horizontal axes between the (N−1)-th and N-th horizontal electrodes are being refreshed, so both the (N−1)-th and N-th horizontal electrodes detect some interference due to the refreshing. When performing the second detection, coincidently pixel horizontal axes between the N-th and (N+1)-th horizontal electrodes are being refreshed, so both the N-th and (N+1)-th horizontal electrodes detect some interference due to the refreshing. When performing the last detection, coincidently pixel horizontal axes between the (N+1)-th and (N+2)-th horizontal electrodes are being refreshed, so both the (N+1)-th and (N+2)-th horizontal electrodes detect some interference due to the refreshing.

After adding up detection values of the three detections, the total detection value for the N-th horizontal electrode would still be higher than those for the other three first electrodes, so the touch sensitive apparatus 310 regards the N-th horizontal electrode as the horizontal electrode that has received the touch sensitive signal.

Similarly, since the detection value of the third detection of the N-th horizontal electrode is the smallest among its three detections, it may be that the smallest detection value among the three detections is taken into calculation, or two detection values that are closer to each other among the three detections are ignored and excluded from the calculation. When performing touch sensitive calculation for a horizontal electrode, detection values of two adjacent horizontal electrodes may be regarded as interferences and therefore ignored or not considered. For example, when taking the third detection result/value of the N-th horizontal electrode into the touch sensitive calculation, detection values of the (N−2)-th, (N−1)-th, (N+1)-th, and (N+2)-th horizontal electrodes may be ignored.

In one embodiment, similar to the embodiment as shown in Table 1, after being aware that a touch event is happened around the N-th horizontal electrode, driving signals may be emitted via the N-th horizontal electrode and sensing the driving signals by all of vertical electrodes or second electrodes 122 according to mutual capacitance principle in order to gather an array of sensing values. Each element in this array is corresponding to an intersection between the N-th horizontal electrode and one of the vertical electrodes. According to this array and the position of the N-th horizontal electrode, a position of the touch event can be calculated.

In an alternative embodiment, after being aware that a touch event is happened around the N-th horizontal electrode, driving signals may be emitted via the (N−1)-th, the N-th and the (N+1)-th horizontal electrodes and sensing the driving signals by all of vertical electrodes or second electrodes 122 according to mutual capacitance principle in a time-sharing manner in order to gather three arrays of sensing values. Based on the three arrays and the positions of the (N−1)-th, the N-th and the (N+1)-th horizontal electrodes, a position of the touch event can be calculated. Since the pixel axes of screen refresh move downward in the moment, the reference interference does not occur around the (N−1)-th through the (N+1)-th horizontal electrodes. The mutual capacitance sensing results via the vertical electrodes are more accurate than the first detection results or the third detection results with refresh interferences.

Tables 4 and 5 show the detection results according to another embodiment of the present invention. Since the size of an external conductive object may be relatively large or be across two or more first electrodes, it's possible for detection results such as those shown in Tables 4 and 5 to occur.

TABLE 4

| | First detection | Second detection | Third detection | Result of judging |
|---|---|---|---|---|
| (N − 1)-th horizontal electrode | EM Interfered by refreshing pixel horizontal axis + Touch sensitive signal | Touch sensitive signal | Touch sensitive signal | Touch sensitive signal actually received |
| N-th horizontal electrode | Touch sensitive signal | EM Interfered by refreshing pixel horizontal axis + Touch sensitive signal | Touch sensitive signal | Touch sensitive signal actually received |
| (N + 1)-th horizontal electrode | | | EM Interfered by refreshing pixel horizontal axis | |

In the embodiment as shown in Table 4, the (N−1)-th and N-th horizontal electrodes have detected a touch sensitive signal. Similarly, in the embodiment as shown in Table 5, the N-th and (N+1)-th horizontal electrodes have detected a touch sensitive signal.

TABLE 5

| | First detection | Second detection | Third detection | Result of judging |
|---|---|---|---|---|
| (N − 1)-th horizontal electrode | EM Interfered by refreshing pixel horizontal axis | | | |
| N-th horizontal electrode | Touch sensitive signal | EM Interfered by refreshing pixel horizontal axis + Touch sensitive signal | Touch sensitive signal | Touch sensitive signal actually received |
| (N + 1)-th horizontal electrode | Touch sensitive signal | Touch sensitive signal | EM Interfered by refreshing pixel horizontal axis | Touch sensitive signal actually received |

The touch sensitive apparatus 310 may judge that two horizontal electrodes adjacent to each other have received a touch sensitive signal, according to a sum result across the three detections. In the embodiment as shown in Table 4, the sum of detection values for the (N−1)-th and N-th horizontal electrodes is larger than that for the (N+1)-th horizontal electrode, so it may be judged that it's the (N−1)-th and N-th horizontal electrodes, rather than the (N+1)-th horizontal electrode, that have received the touch sensitive signal. In the embodiment as shown in Table 5, the sum of detection values for the N-th and (N+1)-th horizontal electrodes is larger than that for the (N−1)-th horizontal electrode, so it may be judged that it's the N-th and (N+1)-th horizontal electrodes, rather than the (N−1)-th horizontal electrode, that have received the touch sensitive signal.

In one embodiment, it may be that the detection result indicating that the horizontal electrode that hasn't received a touch sensitive signal has been interfered is taken into touch sensitive calculation. For example, in the embodiment as shown in Table 4, the (N+1)-th horizontal electrode hasn't received a touch sensitive signal and produces a detection value during the third detection due to being interfered, so the detection result of the third detection is used in touch sensitive calculation, while the detection value of the (N+1)-th horizontal electrode should be ignored. For another example, in the embodiment as shown in Table 5, the (N−1)-th horizontal electrode hasn't received a touch sensitive signal and produces a detection value during the first detection due to being interfered, so the detection result of the first detection is used in touch sensitive calculation, while the detection value of the (N−1)-th horizontal electrode should be ignored.

In another embodiment, it may be that similarity between detection values of a first electrode that has received a touch sensitive signal is taken into account in touch sensitive calculation. For example, in the embodiment as shown in Table 4, the second and third detection values of the (N−1)-th horizontal electrode are similar, and the first and third detection values of the N-th horizontal electrode are similar, so the third detection result(s) is used in touch sensitive calculation. For another example, in the embodiment as shown in Table 5, the first and third detection values of the N-th horizontal electrode are similar, and the first and second detection values of the (N+1)-th horizontal electrode are similar, so the first detection result(s) is used in touch sensitive calculation.

In still another embodiment, it may be that the average of similar detection values of a horizontal electrode that has received a touch sensitive signal is taken into account in touch sensitive calculation. For example, in the embodiment as shown in Table 4, the second and third detection values of the (N−1)-th horizontal electrode are similar, and the first and third detection values of the N-th horizontal electrode are similar, so the average of the second and third detection values of the (N−1)-th horizontal electrode and the average of the first and third detection values of the N-th horizontal electrode are used in touch sensitive calculation. For another example, in the embodiment as shown in Table 5, the first and third detection values of the N-th horizontal electrode are similar, and the first and second detection values of the (N+1)-th horizontal electrode are similar, so the average of the first and third detection values of the N-th horizontal electrode and the average of the first and second detection values of the (N+1)-th horizontal electrode are used in touch sensitive calculation.

In one embodiment, after being aware that a touch event is happened around the N-th and the (N+1)-th horizontal electrodes, driving signals may be emitted via the N-th and the (N+1)-th horizontal electrode and sensing the driving signals by all of vertical electrodes or second electrodes 122 according to mutual capacitance principle in a time-sharing manner in order to gather two arrays of sensing values. According to these two arrays and the positions of the N-th and the (N+1)-th horizontal electrode, a position of the touch event can be calculated.

In an alternative embodiment, after being aware that a touch event is happened around the N-th and the (N+1)-th horizontal electrodes, driving signals may be emitted via the (N−1)-th, the N-th, the (N+1)-th and the (N+2)-th horizontal electrodes and sensing the driving signals by all of vertical electrodes or second electrodes 122 according to mutual capacitance principle in a time-sharing manner in order to gather four arrays of sensing values. Based on the four arrays and the positions of the (N−1)-th, the N-th, the (N+1)-th and the (N+2)-th horizontal electrodes, a position of the touch event can be calculated. Since the pixel axes of screen refresh move downward in the moment, the reference interference does not occur around the (N−1)-th through the (N+2)-th horizontal electrodes. The mutual capacitance sensing results via the vertical electrodes are more accurate than the first detection results or the third detection results with refresh interferences.

A person of ordinary skill in the art can understand that although only three detections are performed or described as examples in these embodiments as shown in Tables 1 to 5, the scope of this invention isn't limited to embodiments in which only three detections are performed and encompasses embodiments in which more than three detections performed or applicable. So, a person of ordinary skill in the art should be able to apply more detections according to the contents of the invention described herein.

In summarized, this application provides a touch sensitive method of a touch sensitive apparatus 310, wherein multiple detections are performed on horizontal electrodes at appropriate intervals, followed by judging which horizontal electrode's detection result is actually related to touch sensitive, or is actually not related to touch sensitive and therefore should be excluded from touch sensitive calculation, which exclusion can help the touch sensitive calculation to avoid the EMI effects due to refreshing of pixel horizontal axes or reduce the EMI effects on the touch sensitive calculation. Or alternatively, based on the judgment, one or more follow up detections via the vertical electrodes are performed accordingly. The touch sensitive calculation based on the follow up detections can avoid or at least alleviate the EMI effects on the touch sensitive calculation.

Figure 4A:
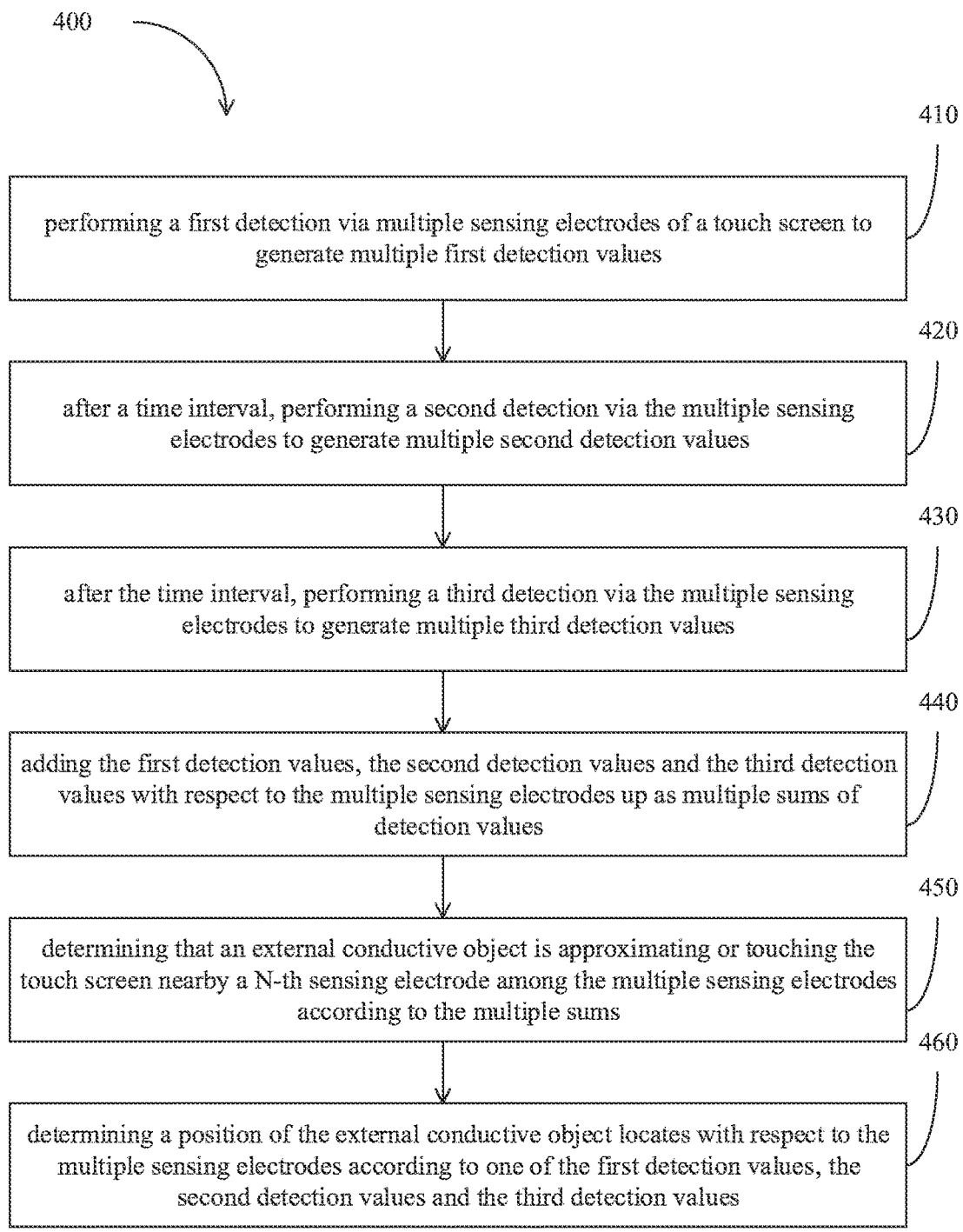
FIG. 4A shows a flowchart diagram of a touch sensitive method 400 in accordance with an embodiment of the present invention.

Please refer to FIG. 4A which shows a flowchart diagram of a touch sensitive method 400 in accordance with the present invention. The method can be supported by the embodiments of Table 1 and Table 3. The touch sensitive method 400 may be implemented by the touch sensitive processing apparatus 310 as shown in FIG. 3. The touch sensitive method 400 may be instructions stored in a non-volatile memory module for execution by the processor module 314. The touch sensitive method 400 includes but not limit to the following steps. Step 410: performing a first detection via multiple sensing electrodes of a touch screen to generate multiple first detection values; Step 420: after a time interval, performing a second detection via the multiple sensing electrodes to generate multiple second detection values; Step 430: after the time interval, performing a third detection via the multiple sensing electrodes to generate multiple third detection values; Step 440: adding the first detection values, the second detection values and the third detection values with respect to the multiple sensing electrodes up as multiple sums of detection values; Step 450: determining that an external conductive object is approximating or touching the touch screen nearby a N-th sensing electrode among the multiple sensing electrodes according to the multiple sums; Step 460: determining a position of the external conductive object locates with respect to the multiple sensing electrodes according to one of the first detection values, the second detection values and the third detection values. The multiple sensing electrodes are parallel to pixel horizontal axes of the touch screen.

Figure 4B:
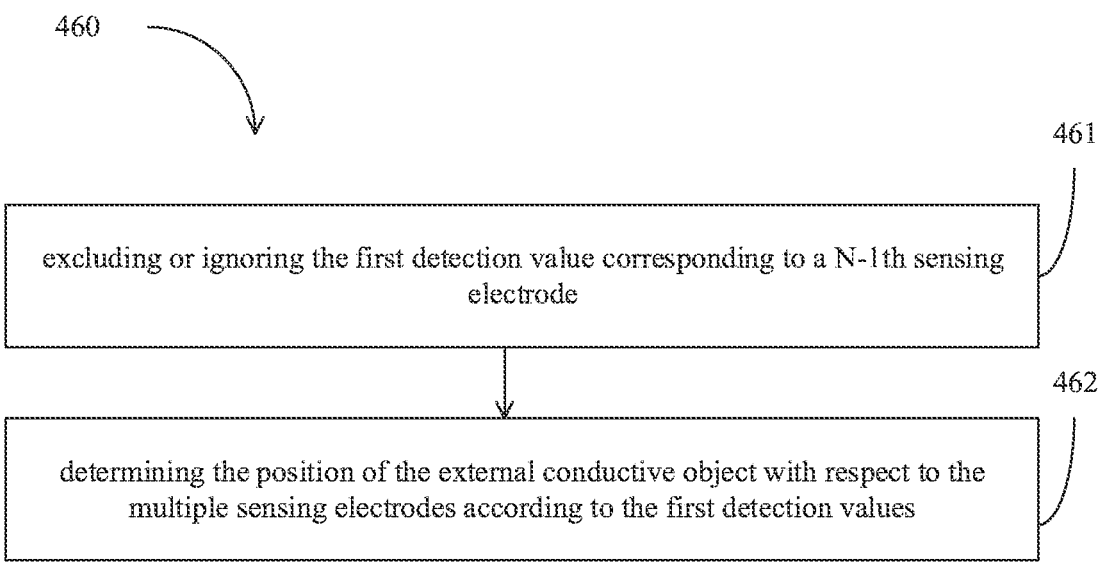
FIG. 4B~4D shows detailed flowchart diagrams of step 460 in accordance with embodiments of the present invention.
Figure 4C:
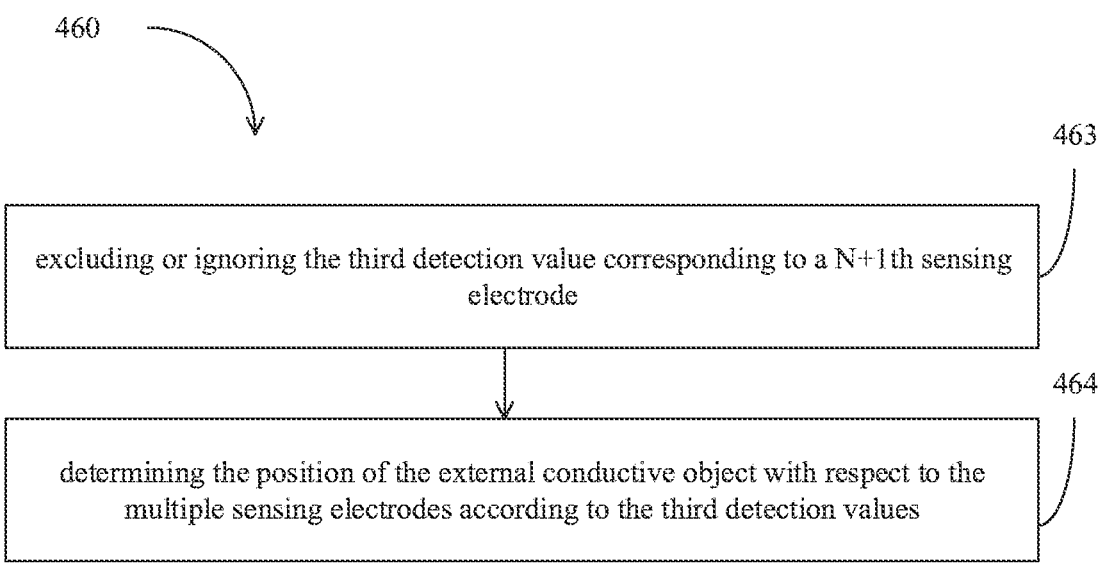
Figure 4D:
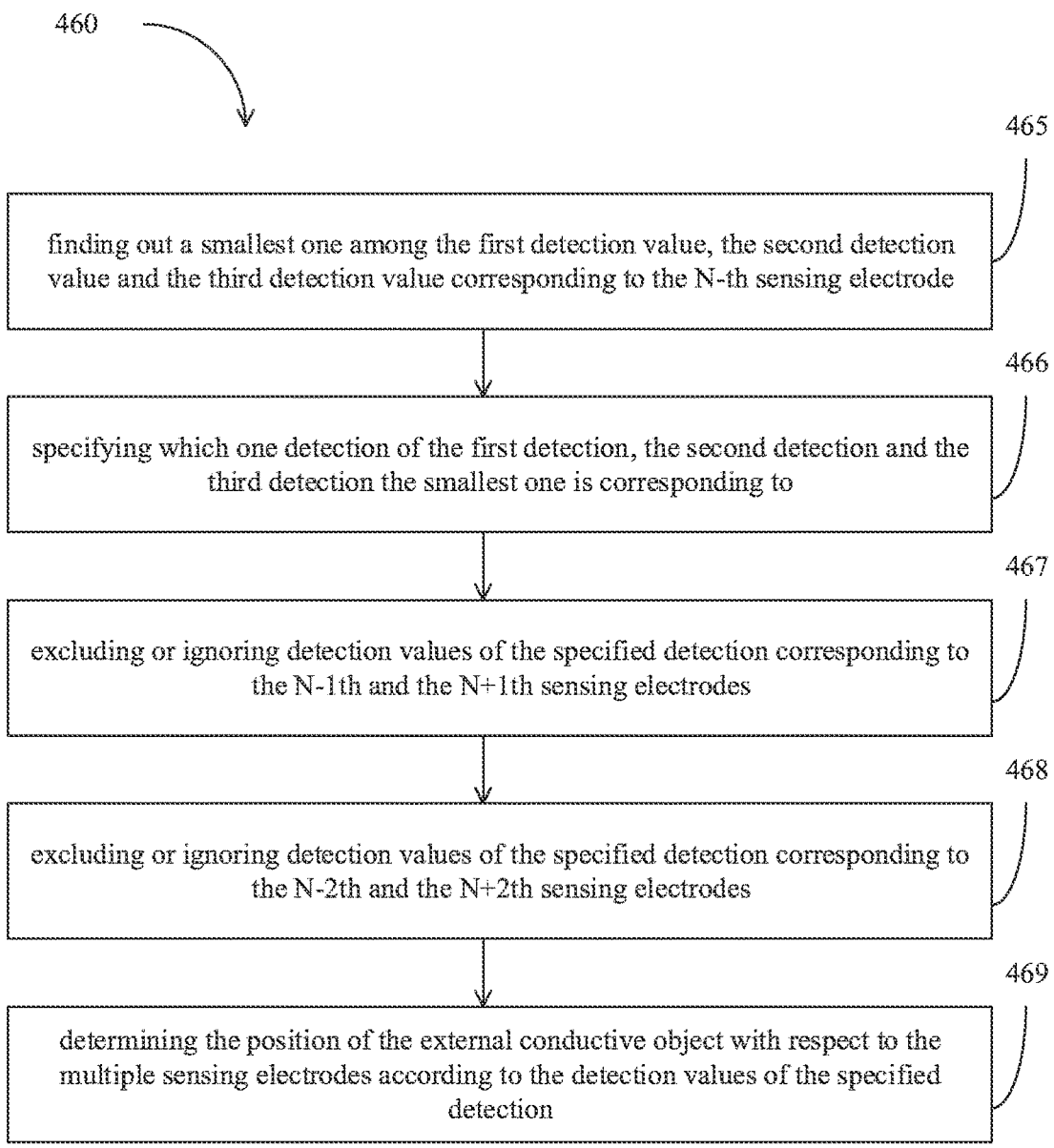

The step 460 may further include three embodiments. Please refer to FIG. 4B, which depicts a flowchart diagram of the step 460 in accordance with a first embodiment of the present invention. In this first embodiment, Step 461: excluding or ignoring the first detection value corresponding to a N−1th sensing electrode; and Step 462: determining the position of the external conductive object with respect to the multiple sensing electrodes according to the first detection values. Please refer to FIG. 4C, which depicts a flowchart diagram of the step 360 in accordance with a second embodiment of the present invention. In this second embodiment, Step 463: excluding or ignoring the third detection value corresponding to a N+1th sensing electrode; and Step 464: determining the position of the external conductive object with respect to the multiple sensing electrodes according to the third detection values. Please refer to FIG. 4D, which depicts a flowchart diagram of the step 460 in accordance with a third embodiment of the present invention. In this third embodiment, Step 465: finding out a smallest one among the first detection value, the second detection value and the third detection value corresponding to the N-th sensing electrode; Step 466: specifying which one detection of the first detection, the second detection and the third detection the smallest one is corresponding to; Step 467: excluding or ignoring detection values of the specified detection corresponding to the N−1th and the N+1th sensing electrodes; optional Step 468: excluding or ignoring detection values of the specified detection corresponding to the N−2th and the N+2th sensing electrodes; Step 469: determining the position of the external conductive object with respect to the multiple sensing electrodes according to the detection values of the specified detection.

According to one embodiment of the present invention, the touch sensitive method 400 can be executed or implemented by the touch sensitive apparatus 310 shown in the FIG. 3. The touch sensitive apparatus 310 may comprise a sensing circuit module 313 connecting to the multiple sensing electrodes for implementing the steps 410, 420 and 430. The touch sensitive apparatus 310 may comprise a processor module 314 connecting to the sensing circuit module 313 for implementing the steps 440, 450 and 460 and steps 461~469 described in the three embodiments of the step 460. The processor module 314 may be an embedded processor or a separate processor which executes software or instructions to fulfill the steps.

In other words, according to the mentioned embodiment, the present invention provides a touch sensitive apparatus for reducing interference from pixel refreshing, comprising: a sensing circuit and a processor connecting to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby a N-th sensing electrode among the multiple sensing electrodes according to the multiple sums; and determining a position of the external conductive object locates with respect to the multiple sensing electrodes according to one of the first detection values, the second detection values and the third detection values. The multiple sensing electrodes are parallel to pixel horizontal axes of the touch screen.

In one embodiment, the processor is further configured for: excluding or ignoring the first detection value corresponding to a N−1th sensing electrode; and determining the position of the external conductive object with respect to the multiple sensing electrodes according to the first detection values. In another embodiment, the processor is further configured for: excluding or ignoring the third detection value corresponding to a N+1th sensing electrode; and determining the position of the external conductive object with respect to the multiple sensing electrodes according to the third detection values. In an embodiment, the processor is further configured for finding out a smallest one among the first detection value, the second detection value and the third detection value corresponding to the N-th sensing electrode; specifying which one detection of the first detection, the second detection and the third detection the smallest one is corresponding to; excluding or ignoring detection values of the specified detection corresponding to the N−1th and the N+1th sensing electrodes; and determining the position of the external conductive object with respect to the multiple sensing electrodes according to the detection values of the specified detection. In a variation, the processor is further configured for excluding or ignoring detection values of the specified detection corresponding to the N−2th and the N+2th sensing electrodes.

According to one embodiment, the present invention provides an electronic system for reducing interference from pixel refreshing, comprising: a touch screen and a touch sensitive apparatus connected to the touch screen. The touch sensitive apparatus comprises a sensing circuit and a processor connecting to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby a N-th sensing electrode among the multiple sensing electrodes according to the multiple sums; and determining a position of the external conductive object locates with respect to the multiple sensing electrodes according to one of the first detection values, the second detection values and the third detection values. The multiple sensing electrodes are parallel to pixel horizontal axes of the touch screen.

Figure 5A:
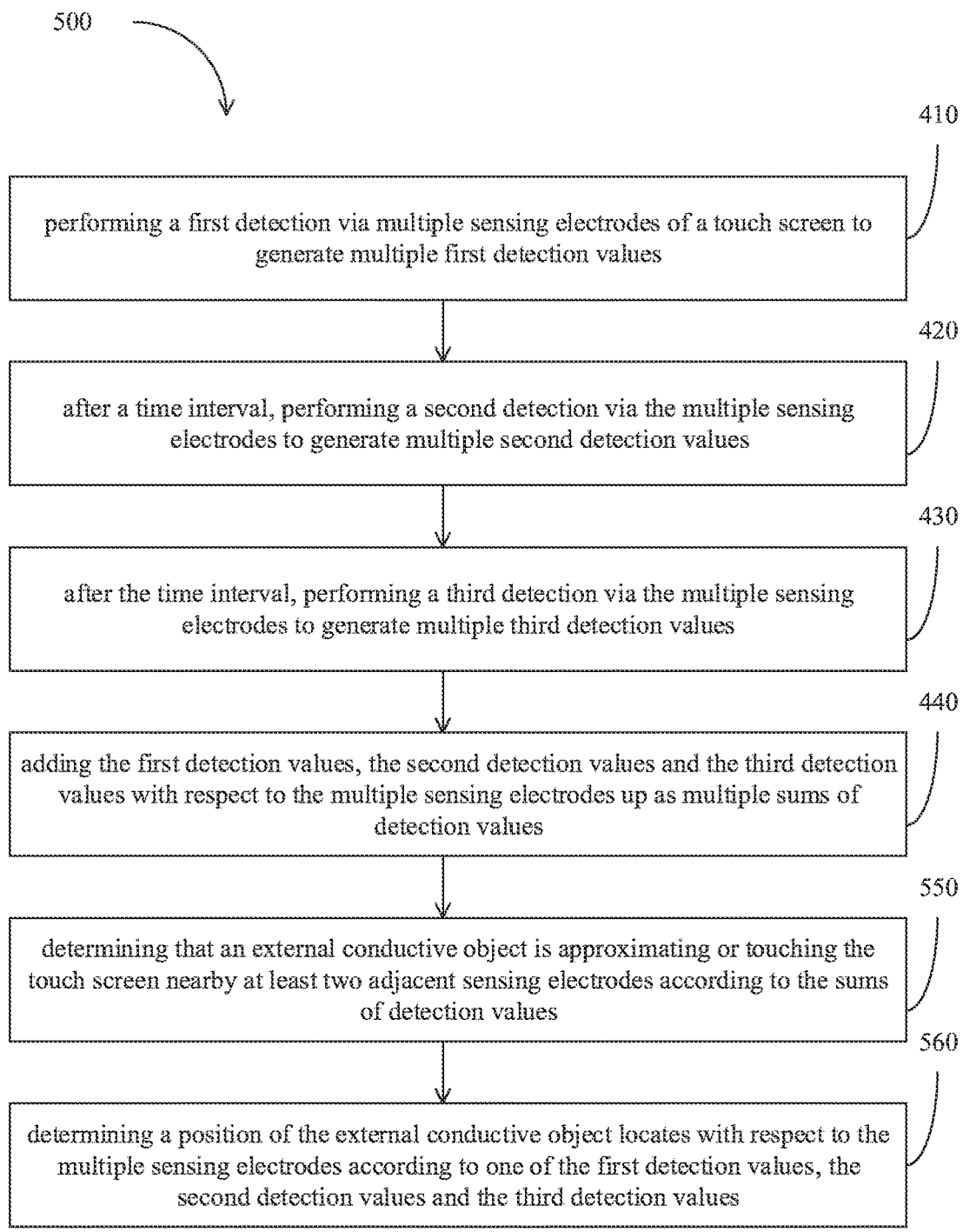
FIG. 5A shows a flowchart diagram of a touch sensitive method 500 in accordance with an embodiment of the present invention.

Please refer to FIG. 5A, which depicts a flowchart diagram of a touch sensitive method 500 in accordance with an embodiment of the present invention. The method may be supported by the embodiments of Table 4 and Table 5. The touch sensitive method 500 may be implemented by the touch sensitive processing apparatus 310. The touch sensitive method 500 may be implemented by instructions stored in non-volatile memory module for execution by the processor module 314. The touch sensitive method 500 includes but not limits to the following steps: The steps 410, 420, 430 and 440 are identical to those steps shown in the FIG. 4A. Hence no duplicated descriptions are elaborated here. Step 550: determining that an external conductive object is approximating or touching the touch screen nearby at least two adjacent sensing electrodes according to the sums of detection values. For example, it could be determined that an external conductive object is approximating or touching the touch screen nearby two adjacent sensing electrodes if the detection values corresponding to these at least two adjacent sensing electrodes are larger than a threshold. Or it could be determined that an external conductive object is approximating or touching the touch screen nearby two adjacent sensing electrodes if both differences between these at least two adjacent detection values and their respective neighboring detection values are larger than another threshold. Next, step 560: determining a position of the external conductive object locates with respect to the multiple sensing electrodes according to one of the first detection values, the second detection values and the third detection values. In the embodiment as shown in Table 4, the step 550 can determine that the N−1th and the N-th sensing electrodes are the at least two adjacent sensing electrodes. In the embodiment as shown in Table 5, the step 550 can determine that the Nth and the N+1-th sensing electrodes are the at least two adjacent sensing electrodes.

Figure 5B:
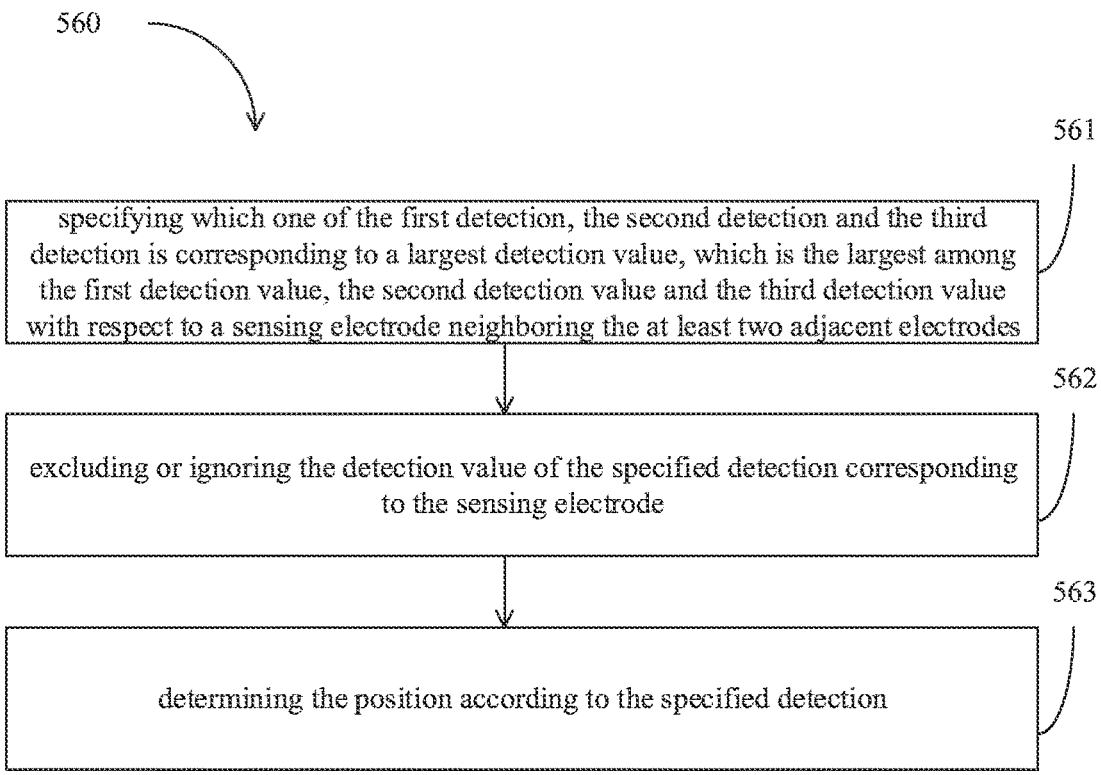
FIG. 5B~5D shows detailed flowchart diagrams of step 560 in accordance with embodiments of the present invention.

Please refer to FIG. 5B, which is a detailed flowchart diagram of the step 560 in accordance with a first embodiment. Step 561: specifying which one of the first detection, the second detection and the third detection is corresponding to a largest detection value, which is the largest among the first detection value, the second detection value and the third detection value with respect to a sensing electrode neighboring the at least two adjacent electrodes. Step 562: excluding or ignoring the detection value of the specified detection corresponding to the sensing electrode. Step 463: determining the position according to the specified detection. For example, in the embodiment as shown in Table 4, the sensing electrode identified by the step 561 is the N+1-th sensing electrode which is neighboring to the N−1th and the N-th sensing electrodes. The largest detection value among the first detection value, the second detection value and the third detection value corresponding to the N+1-th sensing electrode is the third detection value. Therefore the third detection is specified in the step 561. Next, in step 562, the detection value of the third detection corresponding to the N+1-th sensing electrode (i.e. interference from pixel refreshing) is excluded or ignored. Last, in step 563, the position of the external conductive object with respect to the multiple sensing electrodes is determined according to the multiple third detection values. For another example, in the embodiment as shown in Table 5, the sensing electrode identified by the step 461 is the N−1-th sensing electrode which is neighboring to the Nth and the N+1-th sensing electrodes. The largest detection value among the first detection value, the second detection value and the third detection value corresponding to the N−1-th sensing electrode is the first detection value. Next, in step 562, the detection value of the first detection corresponding to the N−1-th sensing electrode (i.e. interference from pixel refreshing) is excluded or ignored. Last, in step 463, the position of the external conductive object with respect to the multiple sensing electrodes is determined according to the multiple first detection values.

Figure 5C:
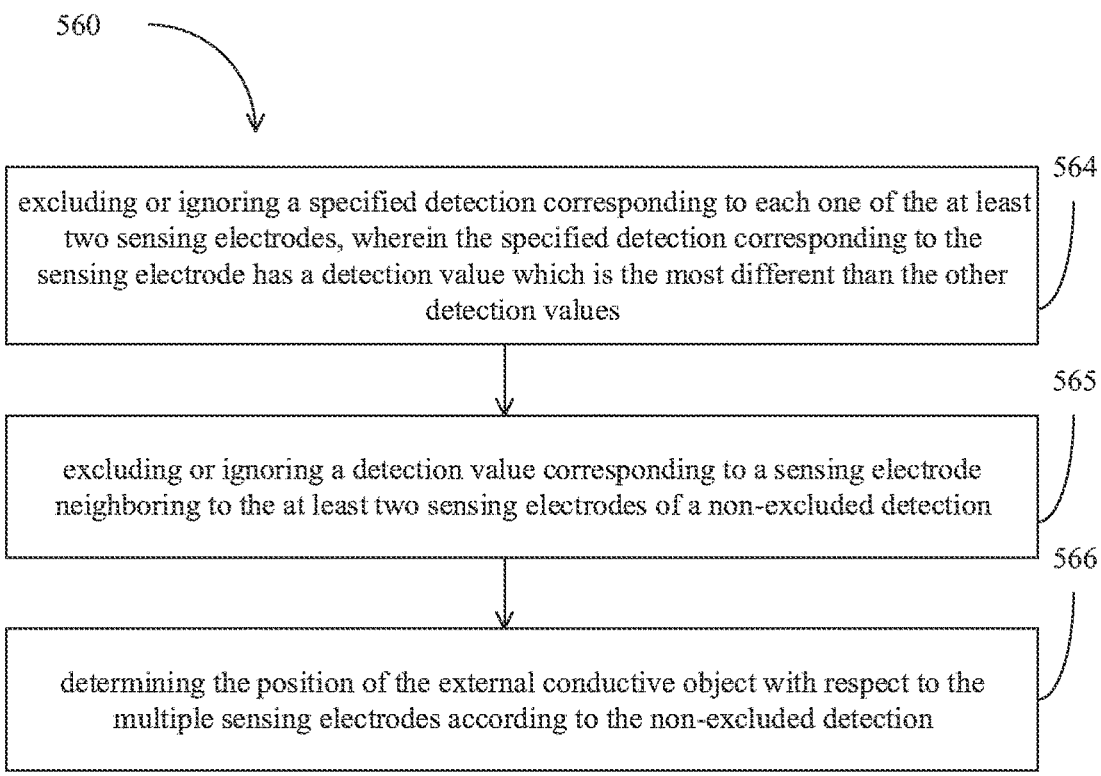

Please refer to FIG. 5C, which is a detailed flowchart diagram of the step 560 in accordance with a second embodiment. Step 564: excluding or ignoring a specified detection corresponding to each one of the at least two sensing electrodes, wherein the specified detection corresponding to the sensing electrode has a detection value which is the most different than the other detection values. Step 565: excluding or ignoring a detection value corresponding to a sensing electrode neighboring to the at least two sensing electrodes of a non-excluded detection. Step 566: determining the position of the external conductive object with respect to the multiple sensing electrodes according to the non-excluded detection. For example, in step 564 of the embodiment as shown in Table 4, the first detection value of the N−1-th sensing electrode is the most different than the other two detection values, thus the first detection values are excluded or ignored. And the second detection value of the N-th sensing value is the most different than the other two detection values, thus the second detection values are excluded or ignored. In step 565, excluding or ignoring the detection value of neighboring sensing electrode (the N+1-th sensing electrode) of the non-excluded third detection values. Last in step 566, the position of the external conductive object with respect to the multiple sensing electrodes is determined according to the third detection values. For example, in step 564 of the embodiment as shown in Table 5, the second detection value of the N-th sensing electrode is the most different than the other two detection values, thus the second detection values are excluded or ignored. The third detection value of the N+1 sensing electrode is the most different than the other two detection values, thus the third detection values are excluded or ignored. In step 565, excluding or ignoring the detection value of neighboring sensing electrode (the N−1-th sensing electrode) of the non-excluded first detection values. Last, in step 566, the position of the external conductive object with respect to the multiple sensing electrodes is determined according to the first detection values.

Figure 5D:
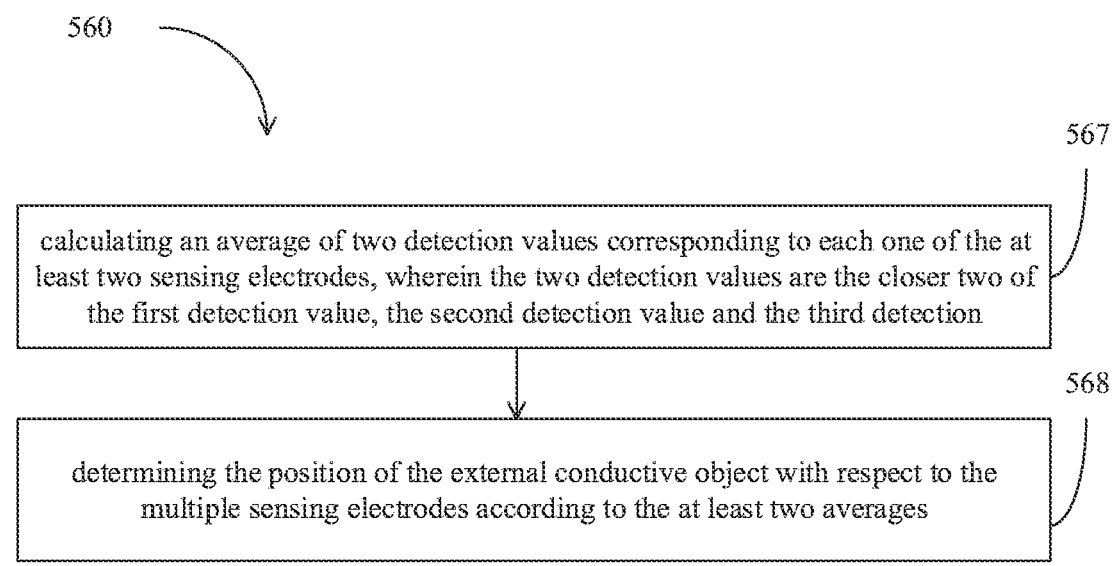

Please refer to FIG. 5D, which is a detailed flowchart diagram of the step 560 in accordance with a third embodiment. Step 567: calculating an average of two detection values corresponding to each one of the at least two sensing electrodes, wherein the two detection values are the closer two of the first detection value, the second detection value and the third detection. In other words, the rest one of them is the most different than the chosen detection values. Step 468: determining the position of the external conductive object with respect to the multiple sensing electrodes according to the at least two averages. For example, in the embodiment as shown in Table 4, the last two detection values corresponding to the N−1-th sensing electrode are closer to each other, and the first and the third detection values corresponding to the N-th sensing electrode are closer to each other. Thus, in step 567, an average of the last two detection values corresponding to the N−1-th sensing electrode is calculated. Another average of the first and the third detection values corresponding to the N-th sensing electrode is calculated. For example, in the embodiment as shown in Table 5, the first and the second detection values corresponding to the N-th sensing electrode are closer to each other. And the first and the third detection values corresponding to the N+1-th sensing electrode are closer to each other. Hence, in step 567, an average of the first and the third detection values corresponding to the N-th sensing electrode is calculated. And another average of the first and the second detection values corresponding to the N+1-th sensing electrode is calculated.

In one embodiment, the present invention provides a touch sensitive apparatus for reducing interference from pixel refreshing, comprising: a sensing circuit and a processor connected to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby at least two adjacent sensing electrodes according to the sums of detection values; and determining a position of the external conductive object locates with respect to the multiple sensing electrodes according to one of the first detection values, the second detection values and the third detection values.

In one example, the processor is further configured for specifying which one of the first detection, the second detection and the third detection is corresponding to a largest detection value, which is the largest among the first detection value, the second detection value and the third detection value with respect to a sensing electrode neighboring the at least two adjacent electrodes; excluding or ignoring the detection value of the specified detection corresponding to the sensing electrode; and determining the position according to the specified detection.

In another example, the processor is further configured for excluding or ignoring a specified detection corresponding to each one of the at least two sensing electrodes, wherein the specified detection corresponding to the sensing electrode has a detection value which is the most different than the other detection values; excluding or ignoring a detection value corresponding to a sensing electrode neighboring to the at least two sensing electrodes of a non-excluded detection; and determining the position of the external conductive object with respect to the multiple sensing electrodes according to the non-excluded detection.

In an alternative example, the processor is further configured for calculating an average of two detection values corresponding to each one of the at least two sensing electrodes, wherein the two detection values are the closer two of the first detection value, the second detection value and the third detection; and determining the position of the external conductive object with respect to the multiple sensing electrodes according to the at least two averages.

In one embodiment, the present invention provides an electronic system for reducing interference from pixel refreshing, comprising: a touch screen and a touch sensitive apparatus connected to the touch screen. The touch sensitive apparatus comprises a sensing circuit and a processor connected to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby at least two adjacent sensing electrodes according to the sums of detection values; and determining a position of the external conductive object locates with respect to the multiple sensing electrodes according to one of the first detection values, the second detection values and the third detection values.

Figure 6:
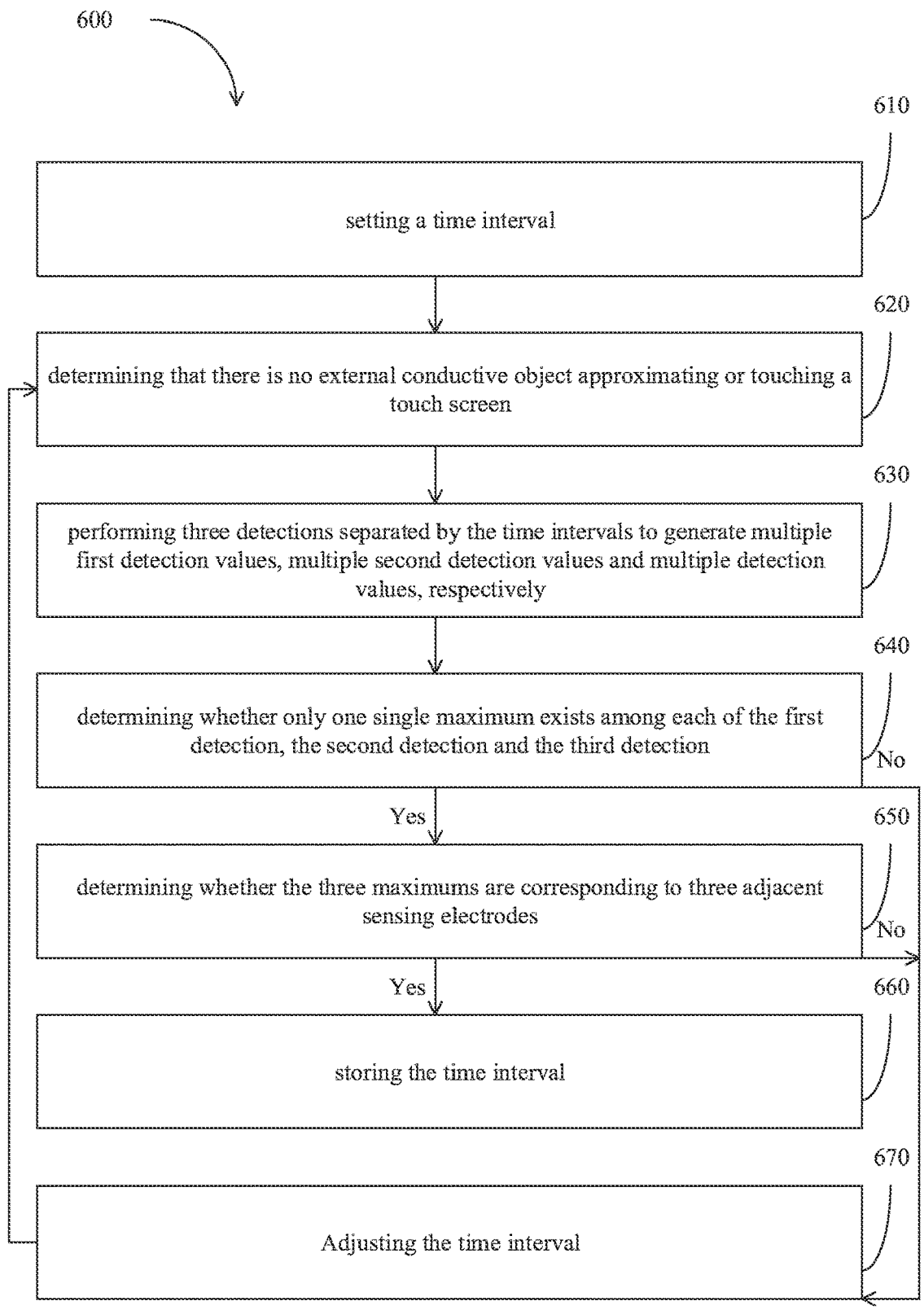
FIG. 6 shows a flowchart diagram of a touch sensitive method 600 in accordance with an embodiment of the present invention.

Please refer to FIG. 6, which shows a flowchart diagram of a touch sensitive method 600 in accordance with an embodiment of the present invention. The method could be supported by the embodiment as shown in Table 2. The time interval that the method generates could be used in the embodiments of FIGS. 4A~D and FIGS. 5A~D. The touch sensitive method 600 may be implemented by the touch sensitive processing apparatus 310 as shown in FIG. 3. The touch sensitive method 600 may be implemented as instructions stored in non-volatile memory module for execution by the processor module 314. Step 610: setting a time interval. For example, an initial value is given to the time interval. Step 620: determining that there is no external conductive object approximating or touching a touch screen. Step 630: performing three detections separated by the time intervals to generate multiple first detection values, multiple second detection values and multiple detection values, respectively. The step 630 may be implemented as the steps 410~430. Step 640: determining whether only one single maximum exists among each of the first detection, the second detection and the third detection. If the determination result is positive, the flow goes to Step 650. Otherwise, the flow continues to Step 670. Step 650: determining whether the three maximums are corresponding to three adjacent sensing electrodes. In case the determination result is positive, the flow goes to Step 660. Step 660: storing the time interval. Step 670: adjusting the time interval. For example, the time interval may be increased if the three maximums are corresponding to one electrode or two adjacent sensing electrodes. In another example, the time interval may be decreased if the three maximums are corresponding to non-adjacent sensing electrodes.

In one embodiment, the present invention provides a touch sensitive apparatus for obtaining a time interval, which can be used in a touch sensitive method for reducing interference from pixel refreshing. The touch sensitive apparatus comprising: a sensing circuit and a processor connecting to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for determining whether only one single maximum exists among each of the first detection, the second detection and the third detection; determining whether the three maximums are corresponding to three adjacent sensing electrodes if only one single maximum exists among each of the first detection, the second detection and the third detection; and storing the time interval if the three maximums are corresponding to three adjacent sensing electrodes, wherein the multiple sensing electrodes are parallel to pixel horizontal axes of the touch screen.

In one embodiment, the present invention provides an electronic system for obtaining a time interval, which can be used in a touch sensitive method for reducing interference from pixel refreshing. The electronic system comprising: a touch screen; a sensing circuit; and a processor connected to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for determining whether only one single maximum exists among each of the first detection, the second detection and the third detection; determining whether the three maximums are corresponding to three adjacent sensing electrodes if only one single maximum exists among each of the first detection, the second detection and the third detection; and storing the time interval if the three maximums are corresponding to three adjacent sensing electrodes, wherein the multiple sensing electrodes are parallel to pixel horizontal axes of the touch screen.

Figure 7A:
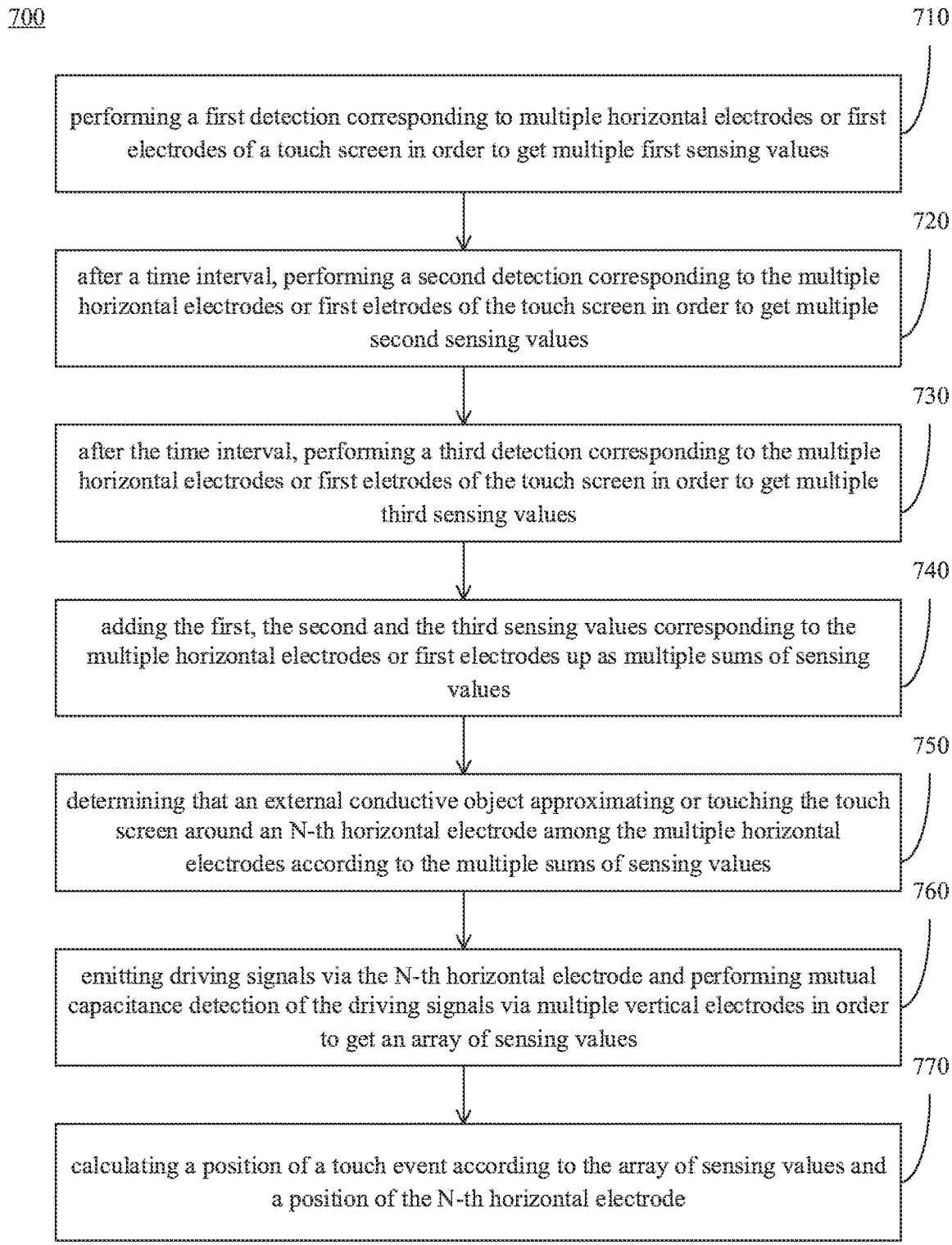
FIG. 7A depicts a flowchart diagram of touch sensitive processing method 700 according to an embodiment of the present invention.

Please refer to FIG. 7A, which depicts a touch sensitive processing method 700 in accordance with an embodiment of the present invention. The touch sensitive processing method 700 may be applicable to the embodiments as shown in Table 1 and Table 3. The touch sensitive processing method 700 may be implemented by the touch sensitive processing apparatus 310. The touch sensitive method 700 may be further implemented as instructions stored in non-volatile memory module for execution by the processor module 314.

Step 710: performing a first detection corresponding to multiple horizontal electrodes or first electrodes of a touch screen in order to get multiple first sensing values.

Step 720: after a time interval, performing a second detection corresponding to the multiple horizontal electrodes or first electrodes of the touch screen in order to get multiple second sensing values. The time interval may be found according to the embodiment as shown in FIG. 6.

Step 730: after the time interval, performing a third detection corresponding to the multiple horizontal electrodes or first electrodes of the touch screen in order to get multiple third sensing values.

Step 740: adding the first, the second and the third sensing values corresponding to the multiple horizontal electrodes or first electrodes up as multiple sums of sensing values.

Step 750: determining that an external conductive object approximating or touching the touch screen around an N-th horizontal electrode among the multiple horizontal electrodes according to the multiple sums of sensing values.

Step 760: emitting driving signals via the N-th horizontal electrode and performing mutual capacitance detection of the driving signals via multiple vertical electrodes in order to get an array of sensing values.

Step 770: calculating a position of a touch event according to the array of sensing values and a position of the N-th horizontal electrode.

Figure 7B:
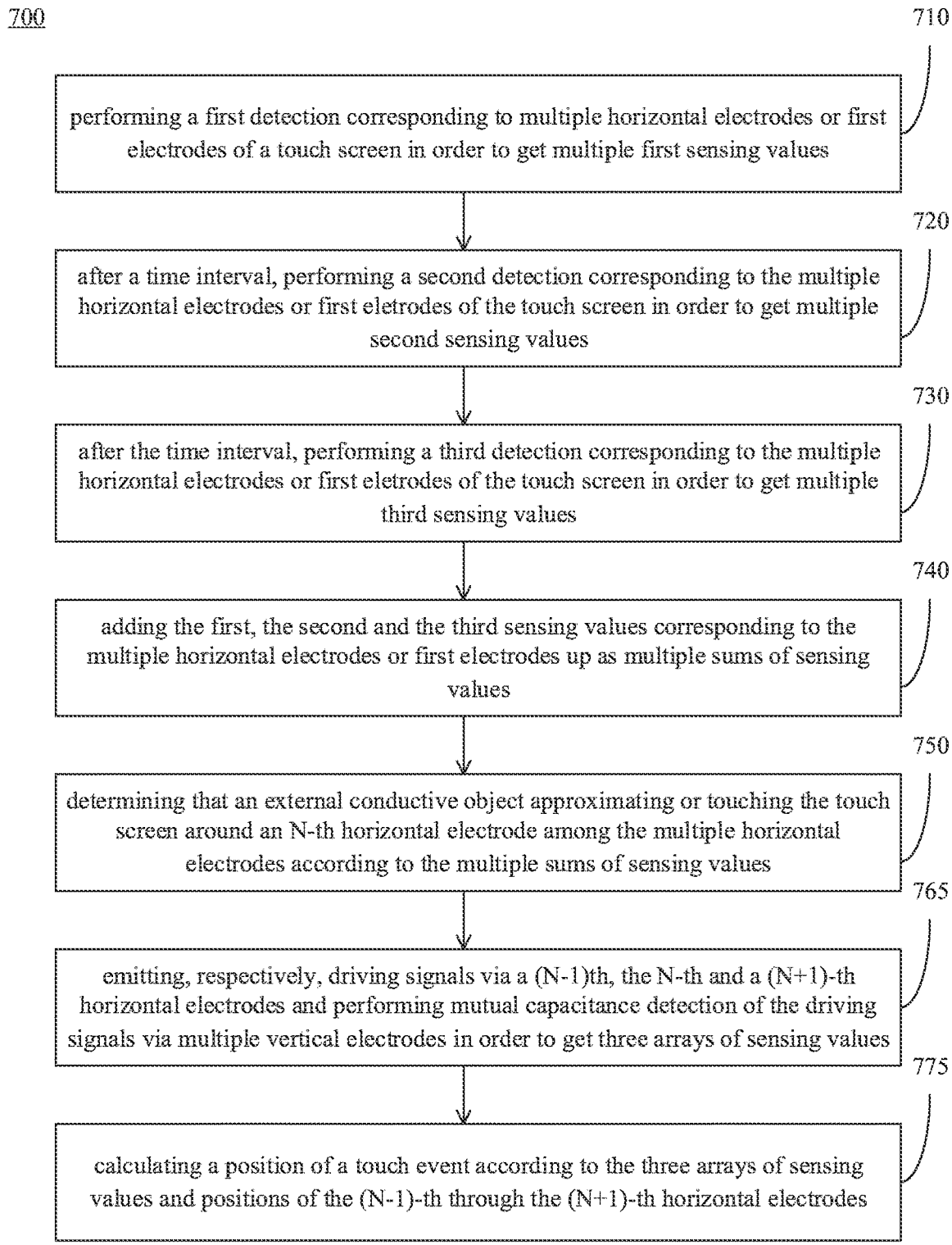
FIG. 7B depicts a flowchart diagram of touch sensitive processing method 700 according to an embodiment of the present invention.

Please refer to FIG. 7B, which depicts a touch sensitive processing method 700 in accordance with an embodiment of the present invention. The touch sensitive processing method 700 may be applicable to the embodiments as shown in Table 1 and Table 3. The touch sensitive processing method 700 is a variant of the embodiment as shown in FIG. 7A. After the step 750 is executed, the touch sensitive processing method 700 as shown in FIG. 7B proceeds to step 765.

Step 765: emitting, respectively, driving signals via a (N−1)th, the N-th and a (N+1)-th horizontal electrodes and performing mutual capacitance detection of the driving signals via multiple vertical electrodes in order to get three arrays of sensing values. Next, the flow proceeds to step 775.

Step 775: calculating a position of a touch event according to the three arrays of sensing values and positions of the (N−1)-th through the (N+1)-th horizontal electrodes.

Figure 7C:
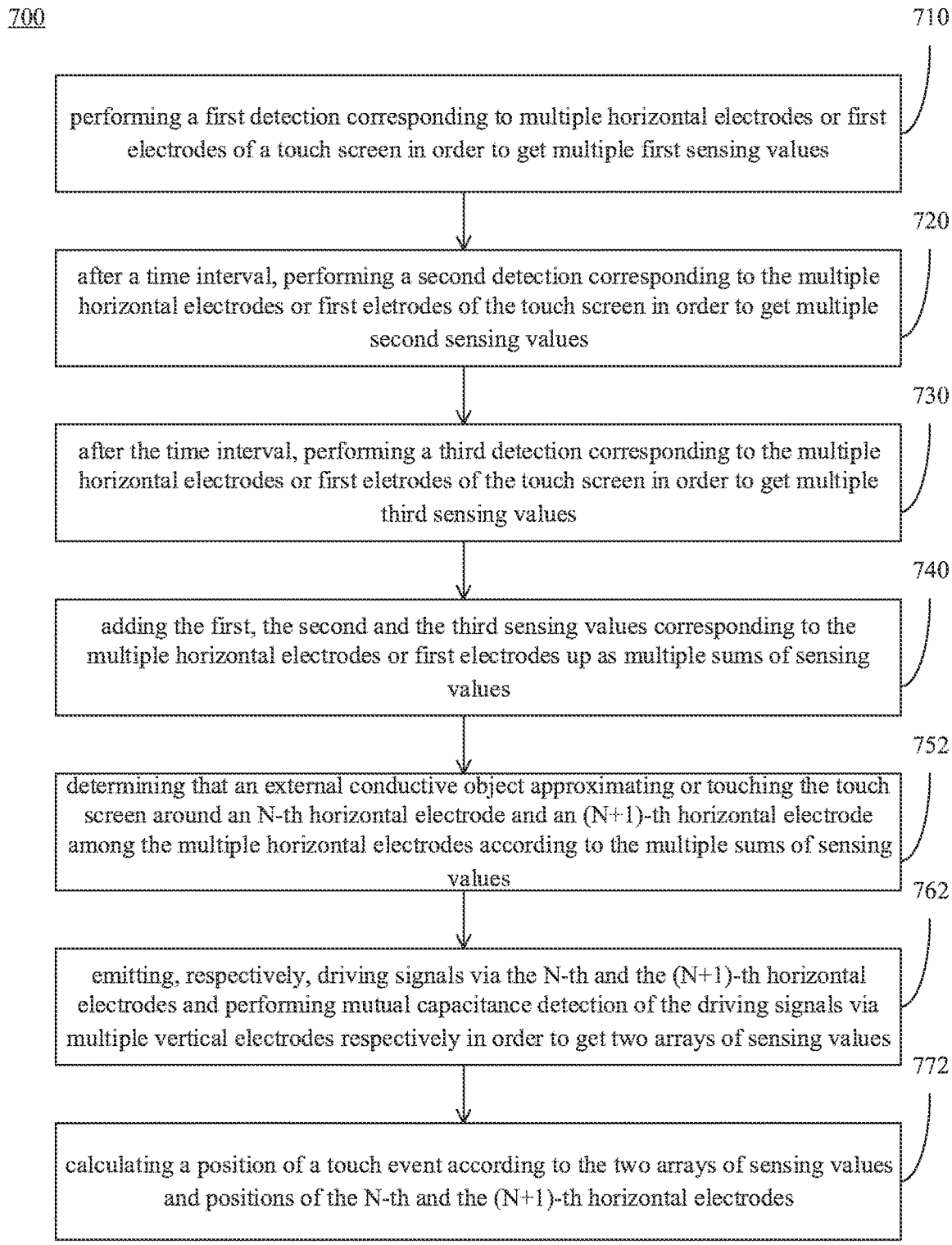
FIG. 7C depicts a flowchart diagram of touch sensitive processing method 700 according to an embodiment of the present invention.

Please refer to FIG. 7C, which depicts a touch sensitive processing method 700 in accordance with an embodiment of the present invention. The touch sensitive processing method 700 may be applicable to the embodiments as shown in Table 4 and Table 5. The touch sensitive processing method 700 is a variant of the embodiment as shown in FIG. 7A. After the step 740 is executed, the touch sensitive processing method 700 as shown in FIG. 7C proceeds to step 752.

Step 752: determining that an external conductive object approximating or touching the touch screen around an N-th horizontal electrode and an (N+1)-th horizontal electrode among the multiple horizontal electrodes according to the multiple sums of sensing values.

Step 762: emitting, respectively, driving signals via the N-th and the (N+1)-th horizontal electrodes and performing mutual capacitance detection of the driving signals via multiple vertical electrodes respectively in order to get two arrays of sensing values.

Step 772: calculating a position of a touch event according to the two arrays of sensing values and positions of the N-th and the (N+1)-th horizontal electrodes.

Figure 7D:
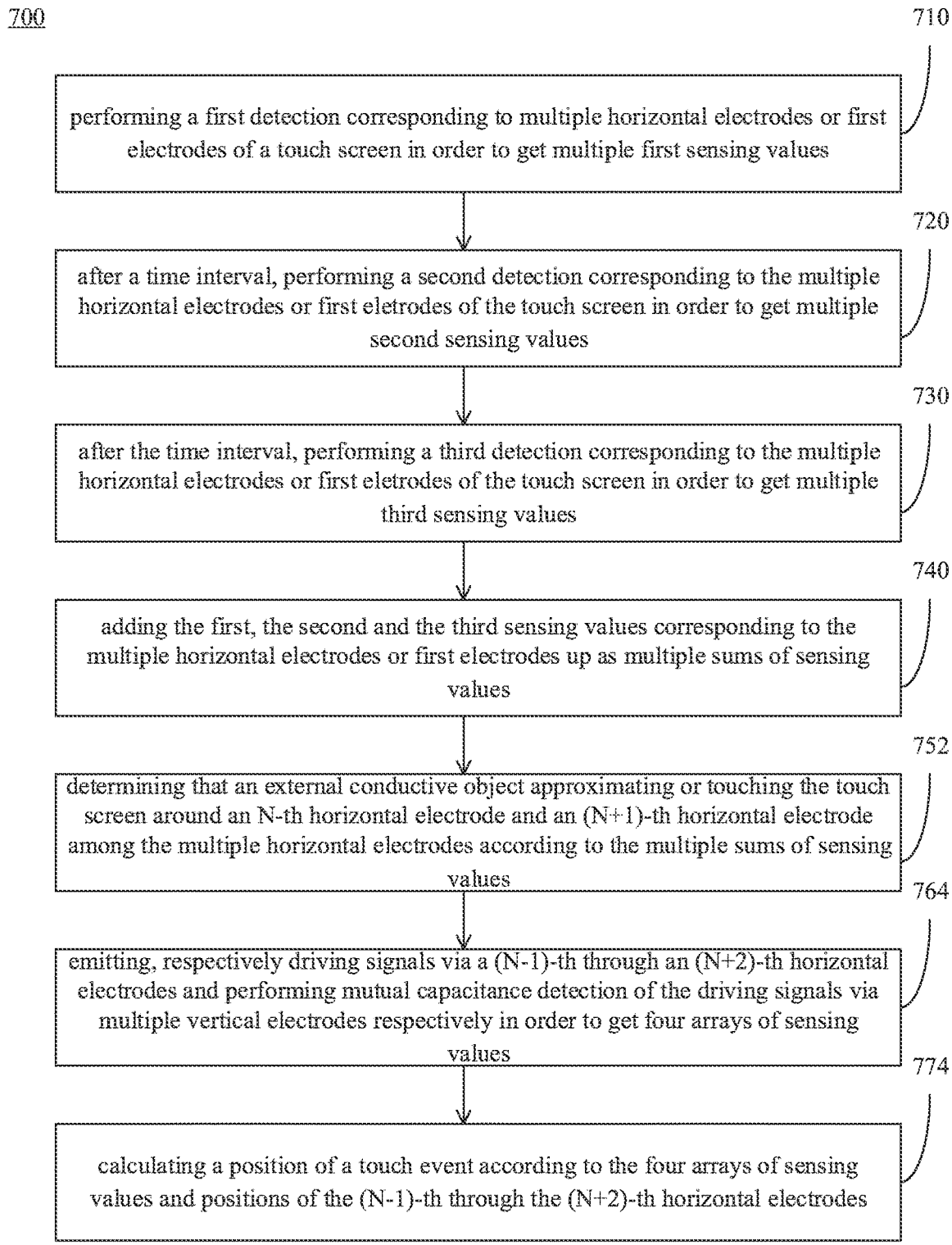
FIG. 7D depicts a flowchart diagram of touch sensitive processing method 700 according to an embodiment of the present invention.

Please refer to FIG. 7D, which depicts a touch sensitive processing method 700 in accordance with an embodiment of the present invention. The touch sensitive processing method 700 may be applicable to the embodiments as shown in Table 4 and Table 5. The touch sensitive processing method 700 is a variant of the embodiment as shown in FIG. 7C. After the step 752 is executed, the touch sensitive processing method 700 as shown in FIG. 7D proceeds to step 764.

Step 764: emitting, respectively driving signals via a (N−1)-th through an (N+2)-th horizontal electrodes and performing mutual capacitance detection of the driving signals via multiple vertical electrodes respectively in order to get four arrays of sensing values.

Step 774: calculating a position of a touch event according to the four arrays of sensing values and positions of the (N−1)-th through the (N+2)-th horizontal electrodes.

According to an aspect of the present invention, a touch sensitive processing method for reducing interference from pixel refreshing is provided. The touch sensitive processing method comprising: performing a first detection via multiple horizontal electrodes of a touch screen to generate multiple first sensing values; after a time interval, performing a second detection via the multiple horizontal electrodes to generate multiple second sensing values; after the time interval, performing a third detection via the multiple horizontal electrodes to generate multiple third sensing values; adding the first sensing values, the second sensing values and the third sensing values with respect to the multiple horizontal electrodes up as multiple sums of sensing values; determining that an external conductive object is approximating or touching the touch screen nearby a N-th horizontal electrode among the multiple horizontal electrodes according to the multiple sums; emitting driving signals via the N-th horizontal electrode and performing mutual-capacitance detection of the driving signals via multiple vertical electrodes in order to get an N-th array of sensing values; and calculating a position of the external conductive object locates according to the array of sensing values and a position of the N-th horizontal electrode, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

Preferably, in order to calculate a more precisely position of the external conductive object, the touch sensitive processing method further comprises: emitting, respectively, driving signals via a (N−1)-th horizontal electrode and a (N+1)-th horizontal electrode and performing mutual-capacitance detection of the driving signals via the multiple vertical electrodes in order to get an (N−1)-th array of sensing values and an (N+1)-th array of sensing values; and calculating the position of the touch event according to the (N−1)-th, the N-th and the (N+1)-th arrays of sensing values and positions of the (N−1)-th, the N-th and the (N+1)-th horizontal electrodes.

According to an aspect of the present invention, a touch sensitive processing apparatus for reducing interference from pixel refreshing is provided. The touch sensitive processing apparatus comprising: a driving circuit module; a sensing circuit module; and a processor module, connecting to the driving circuit module and the sensing circuit module, configured for executing instructions stored in non-volatile memory to realize following steps: having the sensing circuit module to perform a first detection via multiple horizontal electrodes of a touch screen to generate multiple first sensing values; after a time interval, having the sensing circuit module to perform a second detection via the multiple horizontal electrodes to generate multiple second sensing values; after the time interval, having the sensing circuit module to perform a third detection via the multiple horizontal electrodes to generate multiple third sensing values; adding the first sensing values, the second sensing values and the third sensing values with respect to the multiple sensing electrodes up as multiple sums of sensing values; determining that an external conductive object is approximating or touching the touch screen nearby a N-th horizontal electrode among the multiple horizontal electrodes according to the multiple sums; having the driving circuit module to emit driving signals via the N-th horizontal electrode and performing mutual-capacitance detection of the driving signals via multiple vertical electrodes in order to get an N-th array of sensing values; and calculating a position of the external conductive object locates according to the array of sensing values and a position of the N-th horizontal electrode, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

Preferably, in order to calculate a more precisely position of the external conductive object, the processor module is further configured for: having the driving circuit module to emit, respectively, driving signals via a (N−1)-th horizontal electrode and a (N+1)-th horizontal electrode and having the sensing circuit module to perform mutual-capacitance detection of the driving signals via the multiple vertical electrodes in order to get an (N−1)-th array of sensing values and an (N+1)-th array of sensing values; and calculating the position of the touch event according to the (N−1)-th, the N-th and the (N+1)-th arrays of sensing values and positions of the (N−1)-th, the N-th and the (N+1)-th horizontal electrodes.

According to an aspect of the present invention, a touch sensitive processing method for reducing interference from pixel refreshing is provided. The touch sensitive processing method comprising: performing a first detection via multiple horizontal electrodes of a touch screen to generate multiple first sensing values; after a time interval, performing a second detection via the multiple horizontal electrodes to generate multiple second sensing values; after the time interval, performing a third detection via the multiple horizontal electrodes to generate multiple third sensing values; adding the first sensing values, the second sensing values and the third sensing values with respect to the multiple horizontal electrodes up as multiple sums of sensing values; determining that an external conductive object is approximating or touching the touch screen nearby a N-th horizontal electrode and an (N+1)-th horizontal electrode among the multiple horizontal electrodes according to the multiple sums; emitting, respectively, driving signals via the N-th and the (N+1)-th horizontal electrodes and performing mutual-capacitance detection of the driving signals via multiple vertical electrodes in order to get an N-th array of sensing values and an (N+1)-th array of sensing values; and calculating a position of the external conductive object locates according to the N-th and the (N+1)-th arrays of sensing values and positions of the N-th and the (N+1)-th horizontal electrodes, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

Preferably, in order to calculate a more precisely position of the external conductive object, the touch sensitive processing method further comprises: emitting, respectively driving signals via a (N−1)-th horizontal electrode and a (N+2)-th horizontal electrode and performing mutual-capacitance detection of the driving signals via the multiple vertical electrodes, in order to get an (N−1)-th array of sensing values and an (N+2)-th array of sensing values; and calculating the position of the touch event according to the (N−1)-th, the N-th. the (N+1)-th and the (N+2)-th arrays of sensing values and positions of the (N−1)-th, the N-th, the (N+1)-th and the (N+2)-th horizontal electrodes.

According to an aspect of the present invention, a touch sensitive processing apparatus for reducing interference from pixel refreshing is provided. The touch sensitive processing apparatus comprising: a driving circuit module; a sensing circuit module; and a processor module, connecting to the driving circuit module and the sensing circuit module, configured for executing instructions stored in non-volatile memory to realize following steps: having the sensing circuit module to perform a first detection via multiple horizontal electrodes of a touch screen to generate multiple first sensing values; after a time interval, having the sensing module to perform a second detection via the multiple horizontal electrodes to generate multiple second sensing values; after the time interval, having the sensing module to perform a third detection via the multiple horizontal electrodes to generate multiple third sensing values; adding the first sensing values, the second sensing values and the third sensing values with respect to the multiple horizontal electrodes up as multiple sums of sensing values; determining that an external conductive object is approximating or touching the touch screen nearby a N-th horizontal electrode and an (N+1)-th horizontal electrode among the multiple horizontal electrodes according to the multiple sums; having the driving circuit module to emit, respectively, driving signals via the N-th and the (N+1)-th horizontal electrodes and having the sensing module to perform mutual-capacitance detection of the driving signals via multiple vertical electrodes in order to get an N-th array of sensing values and an (N+1)-th array of sensing values; and calculating a position of the external conductive object locates according to the N-th and the (N+1)-th arrays of sensing values and positions of the N-th and the (N+1)-th horizontal electrodes, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

Preferably, in order to calculate a more precisely position of the external conductive object, the processor module is further configured for: having the driving circuit module to emit, respectively driving signals via a (N−1)-th horizontal electrode and a (N+2)-th horizontal electrode and having the sensing circuit module to perform mutual-capacitance detection of the driving signals via the multiple vertical electrodes in order to get an (N−1)-th array of sensing values and an (N+2)-th array of sensing values; and calculating the position of the touch event according to the (N−1)-th, the N-th. the (N+1)-th and the (N+2)-th arrays of sensing values and positions of the (N−1)-th, the N-th, the (N+1)-th and the (N+2)-th horizontal electrodes.

According to an aspect of the present invention, an electronic system for reducing interference from pixel refreshing, comprising: a touch screen and the aforementioned touch sensitive processing apparatus.

The present invention provides touch sensitive processing apparatus and electronic system and processing method thereof for reducing interference from pixel refreshing. According to multiple sensing results with respect to multiple horizontal electrodes separated in well-arranged time intervals, it distinguishes that which one of the horizontal electrodes is relevant to a touch event or which horizontal electrodes are irrelevant to the touch event. Thus it excludes the sensing results corresponding to the horizontal electrodes which are irrelevant to the touch event or performs one or more additional sensing with respect to the relevant horizontal electrode so as that the calculation of a position of the touch event can avoid or at least reduce the electromagnetic interference from pixel refreshing.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive processing method for reducing interference from pixel refreshing: comprising:
    performing a first detection via multiple horizontal electrodes of a touch screen to generate multiple first sensing values;
    after a time interval, performing a second detection via the multiple horizontal electrodes to generate multiple second sensing values;
    after the time interval, performing a third detection via the multiple horizontal electrodes to generate multiple third sensing values;
    adding the first sensing values, the second sensing values and the third sensing values with respect to the multiple horizontal electrodes up as multiple sums of sensing values;
    determining that an external conductive object is approximating or touching the touch screen nearby a N-th horizontal electrode among the multiple horizontal electrodes according to the multiple sums;

emitting driving signals via the N-th horizontal electrode and performing mutual-capacitance detection of the driving signals via multiple vertical electrodes in order to get an N-th array of sensing values; and calculating a position of the external conductive object locates according to the array of sensing values and a position of the N-th horizontal electrode, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

2. The touch sensitive processing method of claim 1, further comprises:

emitting, respectively, driving signals via a (N−1)-th horizontal electrode and a (N+1)-th horizontal electrode and performing mutual-capacitance detection of the driving signals via the multiple vertical electrodes, in order to get an (N−1)-th array of sensing values and an (N+1)-th array of sensing values; and calculating the position of the touch event according to the (N−1)-th, the N-th and the (N+1)-th arrays of sensing values and positions of the (N−1)-th, the N-th and the (N+1)-th horizontal electrodes.

3. A touch sensitive processing apparatus for reducing interference from pixel refreshing, comprising:

a driving circuit module;

a sensing circuit module; and a processor module, connecting to the driving circuit module and the sensing circuit module, configured for executing instructions stored in non-volatile memory to realize following steps:

having the sensing circuit module to perform a first detection via multiple horizontal electrodes of a touch screen to generate multiple first sensing values;

after a time interval, having the sensing circuit module to perform a second detection via the multiple horizontal electrodes to generate multiple second sensing values;

after the time interval, having the sensing circuit module to perform a third detection via the multiple horizontal electrodes to generate multiple third sensing values;

adding the first sensing values, the second sensing values and the third sensing values with respect to the multiple sensing electrodes up as multiple sums of sensing values;

determining that an external conductive object is approximating or touching the touch screen nearby a N-th horizontal electrode among the multiple horizontal electrodes according to the multiple sums;

having the driving circuit module to emit driving signals via the N-th horizontal electrode and performing mutual-capacitance detection of the driving signals via multiple vertical electrodes in order to get an N-th array of sensing values; and calculating a position of the external conductive object locates according to the array of sensing values and a position of the N-th horizontal electrode, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

4. The touch sensitive processing apparatus of claim 3, wherein the processor module is further configured for:

having the driving circuit module to emit, respectively, driving signals via a (N−1)-th horizontal electrode and a (N+1)-th horizontal electrode and having the sensing circuit module to perform mutual-capacitance detection of the driving signals via the multiple vertical electrodes, in order to get an (N−1)-th array of sensing values and an (N+1)-th array of sensing values; and calculating the position of the touch event according to the (N−1)-th, the N-th and the (N+1)-th arrays of sensing values and positions of the (N−1)-th, the N-th and the (N+1)-th horizontal electrodes.

5. A touch sensitive processing method for reducing interference from pixel refreshing: comprising:

performing a first detection via multiple horizontal electrodes of a touch screen to generate multiple first sensing values;

after a time interval, performing a second detection via the multiple horizontal electrodes to generate multiple second sensing values;

after the time interval, performing a third detection via the multiple horizontal electrodes to generate multiple third sensing values;

adding the first sensing values, the second sensing values and the third sensing values with respect to the multiple horizontal electrodes up as multiple sums of sensing values;

determining that an external conductive object is approximating or touching the touch screen nearby a N-th horizontal electrode and an (N+1)-th horizontal electrode among the multiple horizontal electrodes according to the multiple sums;

emitting, respectively, driving signals via the N-th and the (N+1)-th horizontal electrodes and performing mutual-capacitance detection of the driving signals via multiple vertical electrodes in order to get an N-th array of sensing values and an (N+1)-th array of sensing values; and calculating a position of the external conductive object locates according to the N-th and the (N+1)-th arrays of sensing values and positions of the N-th and the (N+1)-th horizontal electrodes, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

6. The touch sensitive processing method of claim 5, further comprises:

emitting, respectively driving signals via a (N−1)-th horizontal electrode and a (N+2)-th horizontal electrode and performing mutual-capacitance detection of the driving signals via the multiple vertical electrodes in order to get an (N−1)-th array of sensing values and an (N+2)-th array of sensing values; and calculating the position of the touch event according to the (N−1)-th, the N-th. the (N+1)-th and the (N+2)-th arrays of sensing values and positions of the (N−1)-th, the N-th, the (N+1)-th and the (N+2)-th horizontal electrodes.

7. A touch sensitive processing apparatus for reducing interference from pixel refreshing, comprising:

a driving circuit module;
a sensing circuit module; and
a processor module, connecting to the driving circuit module and the sensing circuit module, configured for executing instructions stored in non-volatile memory to realize following steps:
  having the sensing circuit module to perform a first detection via multiple horizontal electrodes of a touch screen to generate multiple first sensing values;
  after a time interval, having the sensing module to perform a second detection via the multiple horizontal electrodes to generate multiple second sensing values;
  after the time interval, having the sensing module to perform a third detection via the multiple horizontal electrodes to generate multiple third sensing values;
  adding the first sensing values, the second sensing values and the third sensing values with respect to the multiple horizontal electrodes up as multiple sums of sensing values;
  determining that an external conductive object is approximating or touching the touch screen nearby a N-th horizontal electrode and an (N+1)-th horizontal electrode among the multiple horizontal electrodes according to the multiple sums;
  having the driving circuit module to emit, respectively, driving signals via the N-th and the (N+1)-th horizontal electrodes and having the sensing module to perform mutual-capacitance detection of the driving signals via multiple vertical electrodes in order to get an N-th array of sensing values and an (N+1)-th array of sensing values; and
  calculating a position of the external conductive object locates according to the N-th and the (N+1)-th arrays of sensing values and positions of the N-th and the (N+1)-th horizontal electrodes,
  wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

8. The touch sensitive processing apparatus of claim 7, wherein the processor module is further configured for:
  having the driving circuit module to emit, respectively driving signals via a (N−1)-th horizontal electrode and a (N+2)-th horizontal electrode and having the sensing circuit module to perform mutual-capacitance detection of the driving signals via the multiple vertical electrodes in order to get an (N−1)-th array of sensing values and an (N+2)-th array of sensing values; and
  calculating the position of the touch event according to the (N−1)-th, the N-th, the (N+1)-th and the (N+2)-th arrays of sensing values and positions of the (N−1)-th, the N-th, the (N+1)-th and the (N+2)-th horizontal electrodes.

9. An electronic system for reducing interference from pixel refreshing, comprising:
  a touch screen; and
  a touch sensitive processing apparatus, connecting to the touch screen, comprising:
    a driving circuit module;
    a sensing circuit module; and
    a processor module, connecting to the driving circuit module and the sensing circuit module, configured for executing instructions stored in non-volatile memory to realize following steps:
      having the sensing circuit module to perform a first detection via multiple horizontal electrodes of the touch screen to generate multiple first sensing values;
      after a time interval, having the sensing circuit module to perform a second detection via the multiple horizontal electrodes to generate multiple second sensing values;
      after the time interval, having the sensing circuit module to perform a third detection via the multiple horizontal electrodes to generate multiple third sensing values;
      adding the first sensing values, the second sensing values and the third sensing values with respect to the multiple sensing electrodes up as multiple sums of sensing values;
      determining that an external conductive object is approximating or touching the touch screen nearby a N-th horizontal electrode among the multiple horizontal electrodes according to the multiple sums;
      having the driving circuit module to emit driving signals via the N-th horizontal electrode and performing mutual-capacitance detection of the driving signals via multiple vertical electrodes in order to get an N-th array of sensing values; and
      calculating a position of the external conductive object locates according to the array of sensing values and a position of the N-th horizontal electrode,
      wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

10. The electronic system of claim 9, wherein the processor module is further configured for:
  having the driving circuit module to emit driving signals via a (N−1)-th horizontal electrode and a (N+1)-th horizontal electrode and having the sensing circuit module to perform mutual-capacitance detection of the driving signals via the multiple vertical electrodes, respectively, in order to get an (N−1)-th array of sensing values and an (N+1)-th array of sensing values; and
  calculating the position of the touch event according to the (N−1)-th, the N-th and the (N+1)-th arrays of sensing values and positions of the (N−1)-th, the N-th and the (N+1)-th horizontal electrodes.

11. An electronic system for reducing interference from pixel refreshing, comprising:
  a touch screen; and
  a touch sensitive processing apparatus, connecting to the touch screen, comprising:
    a driving circuit module;
    a sensing circuit module; and
    a processor module, connecting to the driving circuit module and the sensing circuit module, configured for executing instructions stored in non-volatile memory to realize following steps:

having the sensing circuit module to perform a first detection via multiple horizontal electrodes of a touch screen to generate multiple first sensing values;

after a time interval, having the sensing module to perform a second detection via the multiple horizontal electrodes to generate multiple second sensing values;

after the time interval, having the sensing module to perform a third detection via the multiple horizontal electrodes to generate multiple third sensing values;

adding the first sensing values, the second sensing values and the third sensing values with respect to the multiple horizontal electrodes up as multiple sums of sensing values;

determining that an external conductive object is approximating or touching the touch screen nearby a N-th horizontal electrode and an (N+1)-th horizontal electrode among the multiple horizontal electrodes according to the multiple sums;

having the driving circuit module to emit, respectively, driving signals via the N-th and the (N+1)-th horizontal electrodes and having the sensing module to perform mutual-capacitance detection of the driving signals via multiple vertical electrodes in order to get an N-th array of sensing values and an (N+1)-th array of sensing values; and calculating a position of the external conductive object locates according to the N-th and the (N+1)-th arrays of sensing values and positions of the N-th and the (N+1)-th horizontal electrodes, wherein the multiple horizontal electrodes are parallel to pixel horizontal axes of the touch screen, the multiple vertical electrodes are perpendicular to the pixel horizontal axes, the multiple vertical electrodes and the multiple horizontal electrodes form multiple intersections, N is a natural number which is larger than 1.

12. The electronic system of claim 11, wherein the processor module is further configured for:

having the driving circuit module to emit, respectively driving signals via a (N−1)-th horizontal electrode and a (N+2)-th horizontal electrode and having the sensing circuit module to perform mutual-capacitance detection of the driving signals via the multiple vertical electrodes, respectively, in order to get an (N−1)-th array of sensing values and an (N+2)-th array of sensing values; and calculating the position of the touch event according to the (N−1)-th, the N-th. the (N+1)-th and the (N+2)-th arrays of sensing values and positions of the (N−1)-th, the N-th, the (N+1)-th and the (N+2)-th horizontal electrodes.

* * * * *